United States Patent
Swaminath et al.

(10) Patent No.: US 11,102,202 B2
(45) Date of Patent: Aug. 24, 2021

(54) ARCHITECTURE FOR CLOUDCHAIN DRIVEN ECOSYSTEM

(71) Applicant: Brand Media Technologies, Inc., Mountain View, CA (US)

(72) Inventors: Anoop Swaminath, Saratoga, CA (US); Ed Wieczorek, Erie, PA (US)

(73) Assignee: BRAND MEDIA TECHNOLOGIES, INC., Mountain View, CA (US)

( * ) Notice: Subject to any disclaimer, the term of this patent is extended or adjusted under 35 U.S.C. 154(b) by 0 days.

(21) Appl. No.: 16/940,207

(22) Filed: Jul. 27, 2020

(65) Prior Publication Data
US 2021/0037008 A1    Feb. 4, 2021

Related U.S. Application Data

(60) Provisional application No. 62/882,376, filed on Aug. 2, 2019.

(51) Int. Cl.
| | | |
|---|---|---|
| H04L 29/06 | (2006.01) | |
| H04L 9/32 | (2006.01) | |
| H04L 9/06 | (2006.01) | |

(52) U.S. Cl.
CPC ........ H04L 63/0861 (2013.01); H04L 9/0643 (2013.01); H04L 9/3247 (2013.01); H04L 2209/38 (2013.01)

(58) Field of Classification Search
CPC . H04L 63/0861; H04L 9/0643; H04L 9/3247; H04L 2209/38; H04L 63/12; G06N 20/00
See application file for complete search history.

(56) References Cited

U.S. PATENT DOCUMENTS

| | | |
|---|---|---|
| D419,145 S | 1/2000 | Baker et al. |
| D488,164 S | 4/2004 | Kates et al. |
| D490,439 S | 5/2004 | Kates et al. |
| 8,069,125 B2 | 11/2011 | Jung et al. |
| D649,974 S | 12/2011 | Liu et al. |

(Continued)

FOREIGN PATENT DOCUMENTS

| | | | | |
|---|---|---|---|---|
| WO | WO-2019102191 A1 | * | 5/2019 | ............. G06Q 10/06 |
| WO | WO-2021025890 A1 | | 2/2021 | |

OTHER PUBLICATIONS

"Cimpress. E-commerce Platform & Print Builder" May 23, 2019, Behance, site visited Aug. 4, 2020: https://www.behance.net/ gallery/ 80280601/Cinnpress-E-commerce-Platform-Print-Builder (2019).

(Continued)

*Primary Examiner* — Sarah Su
(74) *Attorney, Agent, or Firm* — Wilson Sonsini Goodrich & Rosati

(57) ABSTRACT

Described are platforms, systems, and methods for a secure exchange of personal data with brand data. In one aspect, a method comprises receiving, from a computing device, a request for ownership of a brand, the request comprising a data grouping; persist a smart contract to a distributed ledger, the smart contract associated with the brand and generated based on the data grouping satisfying a criterion for ownership of the brand; and providing, to the computing device, by executing the smart contract, a plurality of opportunities based on the data grouping satisfying the criterion for ownership.

20 Claims, 28 Drawing Sheets

(56) References Cited

U.S. PATENT DOCUMENTS

| | | | |
|---|---|---|---|
| 8,200,775 B2 | 6/2012 | Moore | |
| D715,824 S | 10/2014 | Molaro et al. | |
| 8,909,771 B2 | 12/2014 | Heath | |
| D732,053 S | 6/2015 | Tomita et al. | |
| D757,742 S | 5/2016 | Liu | |
| D773,516 S | 12/2016 | Sun | |
| D775,176 S | 12/2016 | Mitchell et al. | |
| D783,030 S | 4/2017 | Lee et al. | |
| D791,816 S | 7/2017 | Sun | |
| D792,445 S | 7/2017 | Sun | |
| D793,425 S | 8/2017 | Sun | |
| D793,426 S | 8/2017 | Sun | |
| 10,373,212 B2 | 8/2019 | Systrom et al. | |
| D886,838 S | 6/2020 | Martin et al. | |
| D892,142 S | 8/2020 | Clifford et al. | |
| 2002/0057287 A1 | 5/2002 | Crow et al. | |
| 2003/0071860 A1 | 4/2003 | Goddard et al. | |
| 2005/0270307 A1 | 12/2005 | Jacques Brouaux | |
| 2014/0278916 A1 | 9/2014 | Nukala et al. | |
| 2014/0279068 A1 | 9/2014 | Systrom et al. | |
| 2015/0026606 A1 | 1/2015 | Hill et al. | |
| 2015/0082243 A1 | 3/2015 | Taylor et al. | |
| 2017/0186057 A1 | 6/2017 | Metnick | |
| 2017/0206603 A1* | 7/2017 | Al-Masoud | G06Q 40/025 |
| 2017/0353508 A1 | 12/2017 | Yoakum | |
| 2018/0165586 A1 | 6/2018 | Saxena et al. | |
| 2018/0285996 A1 | 10/2018 | Ma | |
| 2019/0005595 A1 | 1/2019 | Tautenhan et al. | |
| 2019/0014116 A1* | 1/2019 | Khi | H04L 9/3271 |
| 2019/0122317 A1 | 4/2019 | Hunn et al. | |
| 2019/0205873 A1* | 7/2019 | Kamalsky | H04L 63/12 |
| 2019/0340623 A1* | 11/2019 | Rivkind | G06F 16/2365 |
| 2020/0175590 A1* | 6/2020 | Huo | G06Q 40/04 |
| 2020/0186510 A1* | 6/2020 | Kursun | H04L 63/08 |
| 2020/0193064 A1* | 6/2020 | Liu | G06N 3/088 |
| 2020/0193449 A1* | 6/2020 | Crumb | G06Q 30/018 |
| 2020/0202668 A1* | 6/2020 | Cotta | A63F 13/792 |
| 2020/0218940 A1* | 7/2020 | Anglin | G06F 21/64 |

OTHER PUBLICATIONS

Co-pending U.S. Appl. No. 29/700,563, inventors Swaminath; Anoop et al., filed on Aug. 2, 2019.

Francis, Kevin. "Celebrity Big Brother 2016" Feb. 10, 2016, Behance, site visited Aug. 4, 2020: https://www.behance.net/ gallery/33887502/Celebrity-Big-Brother-2016 (2016).

Jary, Simon. "VTech InnoTab Max kids tablet review" Dec. 14, 2014, Dribbble, site visited Jul. 31, 2020: https:// www.techadvisor.co.uk/review/vtech-innotab-max-kids-tablet-review-3590915/ (2014).

"Wallet app interface design—3" Oct. 30, 2018, Dribbble, site visited Aug. 4, 2020: https://dribbble.conn/shots/5475858- Wallet-app-interface-design-3 (2018).

PCT/US2020/043772 International Search Report and Written Opinion dated Oct. 15, 2020.

\* cited by examiner

TO FIG. 1B

BRANDMEDIA

BUSINESS COHORTS

‹ BACK

Carolyn Smith - Leader - UPI# 287465

3 of 4 Cohort members confirmed
11/20/18 - 5PM PST zoom

Cohort Name: Sensor AI (Cohort ID: 08376)
THESIS: Retail Sensors for Checkout Will Go Mainstream
PROJECT: Build out of AI team for new startup
STATUS: Seed-Funded We're Looking For: Machine Learning, Solidity,
C++, Python, Product Managers Cohort Status
- John Thomas - Joined
- Dwayne Brady - Joined
- Alexis Copeland - Joined
- ? Pending Q Today, I'm looking for...

7900

CREATE COHORT
JOIN COHORT

SEARCH COHORT NAME/ID or PEOPLE/UPI#

- DATA SCIENCE
- TECH SALES
- ALL INVESTORS
- BLOCKCHAIN

- C, C++, JavaScript
- Product MGMT
- Consensys, Cardano
- Carnegie Mellon, CS

ARCHITECTURE FOR CLOUDCHAIN DRIVEN ECOSYSTEM

CROSS-REFERENCE

This application claims the benefit of U.S. Application No. 62/882,376, filed on Aug. 2, 2019, entitled "ARCHITECTURE FOR CLOUDCHAIN DRIVEN ECOSYSTEM," the contents of which are incorporated herein by reference for all purposes.

BACKGROUND

Current digital systems are highly fragmented and do not encourage user engagement. Moreover, personal data privacy and network security are major concerns for users as well as various governmental bodies. Contributing to such an ecosystem are large technology based monopolies that are dominating brands through the direction (as much as 95 percent) of all internet traffic to a handful of dominant websites. These major players are focused completely on platform monetization and are failing to effectively support brands that are in uncharted territory—having to navigate a turbulent digital landscape in which their power has been usurped—and left in a perilous position at the point of sale. As such, these brands are left scrambling to regain direct access to their customers.

SUMMARY

In one aspect, disclosed herein are interoperable cloud-based systems comprising: a distributed ledger; a back-end system; and a personal computing device, configured to: provide, to the back-end system, a request for ownership of a brand, the request comprising user credentials and a data grouping; and receive, from the back-end system, a data feed comprising a plurality of opportunities associated with the brand; the back-end system configured to: receive, from a Brand Node associated with the brand, a criterion for ownership and the opportunities, the data grouping determined based the criterion for ownership; receive, from the personal computing device, the request for ownership of the brand; generate a smart ownership contract associated with the user credentials and the brand, the smart ownership contract comprising a set of instructions, which, when invoked and executed by one or more processors, cause the one or more processors to perform operations comprising: providing, to the personal computing device, the data feed based on the provided data grouping satisfying the criterion for ownership; persist the smart ownership contract to the distributed ledger; and invoke, when prompted by the Brand Node, the smart ownership contract to provide the data feed to the personal computing device. In some embodiments, the smart ownership contract is updated based on a multi-signature model that requires receiving approval from both the Brand Node and the personal computing device before a change is implemented. In some embodiments, the back-end system is configured to: receive, from the Brand Node, a proposal to change contents of the data mapping; provide the proposal to the personal computing device; and update the smart ownership contract with the changed contents of the data mapping based on an approval received from the personal computing device. In some embodiments, the personal computing device is configured to: provide a view of the brands owned by the user credentials, the ownership of a brand determined based on a respective smart ownership contract between the user credentials and each of the respective brands owned by the user credentials. In some embodiments, facial recognition or biometrics are used to secure the personal computing device and provide profile verification. In some embodiments, the generation of the smart ownership contract does not reveal an identity of a user associated with the user credentials. In some embodiments, the request comprises consent from the user for the Brand Node to access the data grouping. In some embodiments, the criterion for ownership comprises a request for at least one specific type of personal data or metric, and the data grouping comprising the at least one specific type of personal data or metric for the user. In some embodiments, the user credentials comprise universal personal identification (UPI) and a private key associated with a corresponding public address. In some embodiments, the back-end system is configured to: encrypt the data grouping; and persist the encrypted data grouping to a second distributed ledger. In some embodiments, the second distributed ledger comprises an identity blockchain, the encrypted data grouping persisted within a block, and the public address is a pointer in the chain to the encrypted data grouping. In some embodiments, the personal computing device is configured to: receive personal data from a user interface; and generate a Master Data Group comprising the personal data. In some embodiments, the personal computing device is configured to: generate the user credentials and a recovery seed, through an identity chain service provided by the back-end system; and persist the Master Data Group, the Master Data Group associated with the generated user credentials and the recovery seed. In some embodiments, the Master Data Group comprises the data grouping. In some embodiments, the personal computing device is configured to: access, through a block explorer provided by the back-end system, a transaction history associated with the user credentials and stored to the distributed ledger. In some embodiments, the opportunities comprise brand data, and the brand data is self-contained under the Brand Node. In some embodiments, the brand data comprises media associated with the Brand Node. In some embodiments, the brand data comprises investment capital, corporate events, corporate social responsibility, affiliate marketing, product distribution, executive access, product launches, product catalogs, data regarding a headquarters of the brand, data regarding executives of the, and a stock ticker for the brand. In some embodiments, the opportunities are subscription based. In some embodiments, the opportunities comprise interactions, incentives, and rewards with the brand. In some embodiments, the set of instructions of the smart ownership contract comprise: providing the Brand Node associated with the brand access to the data grouping. In some embodiments, the personal computing device is configured to: provide, to the back-end system, user preferences for a user associated with the user credentials, the set of instructions of the smart ownership contract comprising: processing the user preferences through a machine-learning model to determine the opportunities, the machine-learning model having been trained with received user preference for a respective plurality of users who have claimed ownership of the brand. In some embodiments, the machine-learning model comprises a weight of match algorithm. In some embodiments, the personal computing device is configured to: provide, to the back-end system through a geo-location application programing interface (API), real-time geo-location data, the back-end system is configured to: perform a verification check on a location of the personal computing device based on the received real-time geo-location data, the opportunities comprising real-time incentives based on a verified location of the personal computing device. In some embodiments, the data feed comprises content provided by a plurality of brands. In some embodiments, the data feed comprises a user stream and a business opportunities stream. In some embodiments, the user stream and the business opportunities stream are employed to provide display variance of the content provided to the personal computing device based on a plurality of smart ownership contracts associated with the user credentials and the brands determined to be potential matches for ownership. In some embodiments, the data feed is provided through an encrypted communication channel. In some embodiments, the Brand Node is generated for an on-boarded brand entity, and the on-boarded brand entity populates content, accesses data, and tap networks through a Brand Node Interface. In some embodiments, the on-boarded brand entity comprises the brand. In some embodiments, the data feed is consumed according to a Brand Data policy provided by a standardization agreement. In some embodiments, the smart ownership contract allows a free-flow of information between the personal computing device and the Brand Node as a peer-to-peer communication flow. In some embodiments, a collaborative filtering algorithm recommends brands and products based on similar activities of other users. In some embodiments, the recommended brands and products are provided to the personal computing device through the data feed and filtered based on a showcase immersion algorithm. In some embodiments, the collaborative filtering algorithm recommends brands and products based on Global/Local locations, brand preferences, similar interactions, and product interest. In some embodiments, the data feed comprises a flow of offerings at any given time selected based on a personality matrix of data for a user associated with the user credentials, selected preferences, current trends, life events, and display variance. In some embodiments, the opportunities comprise an ability to purchase items from the brand. In some embodiments, the request for ownership of the brand includes a digital signature. In some embodiments, the distributed ledger comprises an opportunities blockchain. In some embodiments, the opportunities blockchain comprises a permissioned private blockchain. In some embodiments, the personal computing device is configured to: provide content from the received data feed through a user interface. In some embodiments, the user interface comprises a display screen. In some embodiments, the content of the data feed is provided to the display screen via a BrandCube graphical user-interface received from the back-end system. In some embodiments, the providing of the content of the data feed is compatible with advertisement blockers.

In another aspect, disclosed herein are computer-implemented methods for a secure exchange of personal data with brand data comprising: receiving, from a Brand Node associated with a brand, a criterion for ownership and a plurality of opportunities, the opportunities comprising the brand data; receiving, from a computing device, a request for ownership of the brand; the request comprising user credentials and a data grouping, the data grouping determined based the criterion for ownership and comprises the personal data; generating a smart ownership contract associated with the user credentials and the brand, the smart ownership contract comprising a set of instructions, which, when invoked and executed by the one or more processors, cause the one or more processors to perform operations comprising: providing, to the computing device, a data feed based on the provided data grouping satisfying the criterion for ownership, the data feed comprising the opportunities; persisting the smart ownership contract to a distributed ledger; and invoking, when prompted by the Brand Node, the smart ownership contract to provide the opportunities to the computing device. In some embodiments, the smart ownership contract is updated based on a multi-signature model that requires receiving approval from both the Brand Node and the computing device before a change is implemented. In some embodiments, the methods comprise: receiving, from the Brand Node, a proposal to change contents of data mapping; providing the proposal to the computing device; and updating the smart ownership contract with the changed contents of the data mapping based on an approval received from the computing device. In some embodiments, the generating of the smart ownership contract does not reveal an identity of a user associated with the user credentials. In some embodiments, the request comprises consent from the user for the Brand Node to access the data grouping. In some embodiments, the criterion for ownership comprises a request for at least one specific type of personal data or metric, and the data grouping comprising the at least one specific type of personal data or metric for the user. In some embodiments, the user credentials comprise a UPI and a private key associated with a corresponding public address. In some embodiments, the methods comprise: encrypting the data grouping; and persisting the encrypted data grouping to a second distributed ledger. In some embodiments, the second distributed ledger comprises an identity blockchain, the encrypted data grouping persisted within a block, and the public address is a pointer in the chain to the encrypted data grouping. In some embodiments, the methods comprise: providing a block explorer to the computing device, the block explorer providing access to a transaction history associated with the user credentials and stored to the distributed ledger. In some embodiments, the opportunities comprise brand data, and the brand data is self-contained under the Brand Node. In some embodiments, the brand data comprises media associated with the Brand Node. In some embodiments, the brand data comprises investment capital, corporate events, corporate social responsibility, affiliate marketing, product distribution, executive access, product launches, product catalogs, data regarding a headquarters of the brand, data regarding executives of the, and a stock ticker for the brand. In some embodiments, the opportunities are subscription based. In some embodiments, the opportunities comprise interactions, incentives, and rewards with the brand. In some embodiments, the set of instructions of the smart ownership contract comprise: providing the Brand Node associated with the brand access to the data grouping. In some embodiments, the methods comprise: receiving, from the computing device, user preferences for a user associated with the user credentials, the set of instructions of the smart ownership contract comprising: processing the user preferences through a machine-learning model to determine the opportunities, the machine-learning model having been trained with received user preference for a respective plurality of users who have claimed ownership of the brand. In some embodiments, the machine-learning model comprises a weight of match algorithm. In some embodiments, the methods comprise: receiving, from the computing device, real-time geo-location data; and performing a verification check on a location of the computing device based on the received real-time geo-location data, the opportunities comprising real-time incentives based on a verified location of the computing device. In some embodiments, the data feed comprises content provided by a plurality of brands. In some embodiments, the data feed comprises a user stream and a business opportunities stream. In some embodiments, the user stream and the business opportunities stream are employed to provide display variance of the content provided to the computing device based on a plurality of smart ownership contracts associated with the user credentials and the brands determined to be potential matches for ownership. In some embodiments, the data feed is provided through an encrypted communication channel. In some embodiments, the Brand Node is generated for an on-boarded brand entity, and the on-boarded brand entity populates content, accesses data, and tap networks through a Brand Node Interface. In some embodiments, the on-boarded brand entity comprises the brand. In some embodiments, the data feed is consumed according to a Brand Data policy provided by a standardization agreement. In some embodiments, the smart ownership contract allows a free-flow of information between the computing device and the Brand Node as a peer-to-peer communication flow. In some embodiments, a collaborative filtering algorithm recommends brands and products based on similar activities of other users. In some embodiments, the recommended brands and products are provided to the personal computing device through the data feed and filtered based on a showcase immersion algorithm. In some embodiments, the collaborative filtering algorithm recommends brands and products based on Global/Local locations, brand preferences, similar interactions, and product interest. In some embodiments, the data feed comprises a flow of offerings at any given time selected based on a personality matrix of data for a user associated with the computing device, selected preferences, current trends, life events, and display variance. In some embodiments, the opportunities comprise an ability to purchase items from the brand. In some embodiments, the request for ownership of the brand includes a digital signature. In some embodiments, the distributed ledger comprises an opportunities blockchain. In some embodiments, the opportunities blockchain comprises a permissioned private blockchain.

In another aspect, disclosed herein are non-transitory computer-readable storage media coupled to one or more processors and having instructions stored thereon which, when executed by the one or more processors, cause the one or more processors to perform operations comprising: providing, to a back-end system, a request for ownership of a brand, the request comprising user credentials, a data grouping, and consent for a Brand Node associated with the brand to access the data grouping, the data grouping determined based on a criterion for ownership of the brand; and receiving, from the back-end system, a data feed comprising a plurality of opportunities associated with the brand, the opportunities provided by a smart ownership contract stored to a distributed ledger and associated with the user credentials and the brand. In some embodiments, the operations comprise: providing, to the back-end system, a first approval to update the smart ownership contract, the smart ownership contract updated based on a multi-signature model that requires the back-end system receiving the first approval and a second approval from both the Brand Node. In some embodiments, the operations comprise: providing a view of brands owned by the user credentials, the ownership of a brand determined based on a respective smart ownership contract between the user credentials and each of the respective brands owned by the user credentials. In some embodiments, the operations comprise: providing a profile verification based on facial recognition or biometrics. In some embodiments, the request comprises consent for the Brand Node to access the data grouping. In some embodiments, the criterion for ownership comprises a request for at least one specific type of personal data or metric, and the data grouping comprising the at least one specific type of personal data or metric for a user associated with the user credentials. In some embodiments, the user credentials comprise a UPI and a private key associated with a corresponding public address. In some embodiments, the operations comprise: receiving personal data from a user interface; and generating a Master Data Group comprising the personal data. In some embodiments, the operations comprise: generating the user credentials and a recovery seed, through an identity chain service provided by the back-end system; and persist the Master Data Group, the Master Data Group associated with the generated user credentials and the recovery seed. In some embodiments, the Master Data Group comprises the data grouping. In some embodiments, the operations comprise: accessing, through a block explorer provided by the back-end system, a transaction history associated with the user credentials and stored to the distributed ledger. In some embodiments, the opportunities comprise brand data, and the brand data is self-contained under the Brand Node. In some embodiments, the brand data comprises media associated with the Brand Node. In some embodiments, the brand data comprises investment capital, corporate events, corporate social responsibility, affiliate marketing, product distribution, executive access, product launches, product catalogs, data regarding a headquarters of the brand, data regarding executives of the, and a stock ticker for the brand. In some embodiments, the opportunities are subscription based. In some embodiments, the opportunities comprise interactions, incentives, and rewards with the brand. In some embodiments, the operations comprise: providing user preferences for a user associated with the user credentials, the opportunities determined by processing the user preferences through a machine-learning model, the machine-learning model having been trained with received user preference for a respective plurality of users who have claimed ownership of the brand. In some embodiments, the machine-learning model comprises a weight of match algorithm. In some embodiments, the operations comprise: providing, to the back-end system through a geo-location API, real-time geo-location data, the opportunities comprising real-time incentives based on a verified location determined based on the real-time geo-location data. In some embodiments, the data feed comprises content provided by a plurality of brands. In some embodiments, the data feed comprises a user stream and a business opportunities stream. In some embodiments, the user stream and the business opportunities stream are employed to provide display variance of the content based on a plurality of smart ownership contracts associated with the user credentials and the brands determined to be potential matches for ownership. In some embodiments, the data feed is provided through an encrypted communication channel. In some embodiments, the Brand Node is generated for an on-boarded brand entity, and the on-boarded brand entity populates content, accesses data, and tap networks through a Brand Node Interface. In some embodiments, the on-boarded brand entity comprises the brand. In some embodiments, the data feed is consumed according to a Brand Data policy provided by a standardization agreement. In some embodiments, the smart ownership contract allows a free-flow of information between the media and the Brand Node as a peer-to-peer communication flow. In some embodiments, the data feed comprises recommended brands and products determined through a collaborative filtering algorithm based on similar activities of other users. In some embodiments, the collaborative filtering algorithm recommends brands and products based on Global/Local locations, brand preferences, similar interactions, and product interest. In some embodiments, the data feed comprises a flow of offerings at any given time selected based on a personality matrix of data for a user associated with the user credentials, selected preferences, current trends, life events, and display variance. In some embodiments, the opportunities comprise an ability to purchase items from the brand. In some embodiments, the request for ownership of the brand includes a digital signature. In some embodiments, the distributed ledger comprises an opportunities blockchain. In some embodiments, the opportunities blockchain comprises a permissioned private blockchain. In some embodiments, the operations comprise: providing content from the data feed through a user interface. In some embodiments, the user interface comprises a display screen. In some embodiments, the content of the data feed is provided to the display screen via a BrandCube graphical user-interface received from the back-end system. In some embodiments, the providing of the content of the data feed is compatible with advertisement blockers.

In another aspect, disclosed herein are computer-implemented methods for a secure exchange of data comprising: receiving, from a computing device, a request for ownership of a brand, the request comprising a data grouping; persist a smart contract to a distributed ledger, the smart contract associated with the brand and generated based on the data grouping satisfying a criterion for ownership of the brand; and providing, to the computing device, by executing the smart contract, a plurality of opportunities based on the data grouping satisfying the criterion for ownership. In some embodiments, the smart contract is updated based on a multi-signature model that requires receiving approval from both the brand and the computing device before a change is implemented. In some embodiments, the approval from the brand is received through a Brand Node. In some embodiments, the methods comprise: receiving, from the Brand Node, a proposal to change contents of data mapping; providing the proposal to the computing device; and updating the smart contract with the changed contents of the data mapping based on an approval received from the computing device. In some embodiments, the request comprises consent for the brand to access the data grouping. In some embodiments, the brand accesses the data grouping through a Brand Node. In some embodiments, the smart contract provides access to the data grouping to the Brand Node. In some embodiments, the opportunities comprise brand data, and the brand data is self-contained under a Brand Node. In some embodiments, the brand data comprises media associated with the Brand Node. In some embodiments, the brand data comprises investment capital, corporate events, corporate social responsibility, affiliate marketing, product distribution, executive access, product launches, product catalogs, data regarding a headquarters of the brand, data regarding executives of the, and a stock ticker for the brand. In some embodiments, the Brand Node is generated for an on-boarded brand entity, and the on-boarded brand entity populates content, accesses data, and tap networks through a Brand Node Interface. In some embodiments, the on-boarded brand entity comprises the brand. In some embodiments, the smart contract allows a free-flow of information between the computing device and the Brand Node as a peer-to-peer communication flow. In some embodiments, the criterion for ownership comprises a request for at least one specific type of personal data or metric, and the data grouping comprising the at least one specific type of personal data or metric for a user. In some embodiments, the request comprises user credentials associated with a user. In some embodiments, the user credentials comprise a UPI and a private key associated with a corresponding public address. In some embodiments, the methods comprise: providing a block explorer to the computing device, the block explorer providing access to a transaction history associated with the user credentials and stored to the distributed ledger. In some embodiments, the opportunities are provided to the computing device through a data feed. In some embodiments, the data feed comprises content provided by a plurality of brands. In some embodiments, the data feed comprises a user stream and a business opportunities stream. In some embodiments, the user stream and the business opportunities stream are employed to provide display variance of the content provided to the computing device based on a plurality of smart ownership contracts associated with a user associated with the computing device and the brands determined to be potential matches for ownership. In some embodiments, the data feed is provided through an encrypted communication channel. In some embodiments, the data feed is consumed according to a Brand Data policy provided by a standardization agreement. In some embodiments, a collaborative filtering algorithm recommends brands and products based on similar activities of other users. In some embodiments, the recommended brands and products are provided to the personal computing device through the data feed and filtered based on a showcase immersion algorithm. In some embodiments, the collaborative filtering algorithm recommends brands and products based on Global/Local locations, brand preferences, similar interactions, and product interest. In some embodiments, the data feed comprises a flow of offerings at any given time selected based on a personality matrix of data for a user associated with the computing device, selected preferences, current trends, life events, and display variance. In some embodiments, the methods comprise: encrypting the data grouping; and persisting the encrypted data grouping to a second distributed ledger. In some embodiments, the second distributed ledger comprises an identity blockchain, the encrypted data grouping is persisted within a block, and the public address is a pointer in the chain to the encrypted data grouping. In some embodiments, the opportunities are subscription based. In some embodiments, the opportunities comprise interactions, incentives, and rewards with the brand. In some embodiments, the methods comprise: receiving, from the computing device, user preferences for a user; and processing the user preferences through a machine-learning model to determine the opportunities, the machine-learning model having been trained with received user preference for a respective plurality of users who have claimed ownership of the brand. In some embodiments, the machine-learning model comprises a weight of match algorithm. In some embodiments, the methods comprise: receiving, from the computing device, real-time geo-location data; and performing a verification check on a location of the computing device based on the received real-time geo-location data, the opportunities comprise real-time incentives based on a verified location of the computing device. In some embodiments, the opportunities comprise an ability to purchase items from the brand. In some embodiments, the request for ownership of the brand includes a digital signature. In some embodiments, the distributed ledger comprises an opportunities blockchain. In some embodiments, the opportunities blockchain comprises a permissioned private blockchain.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 10A-10J depict various non-limiting example pages of a user interface (UI) for a CloudChain Global Marketplace provided by the described interoperable cloud-based system;

DETAILED DESCRIPTION

Figure 1A:
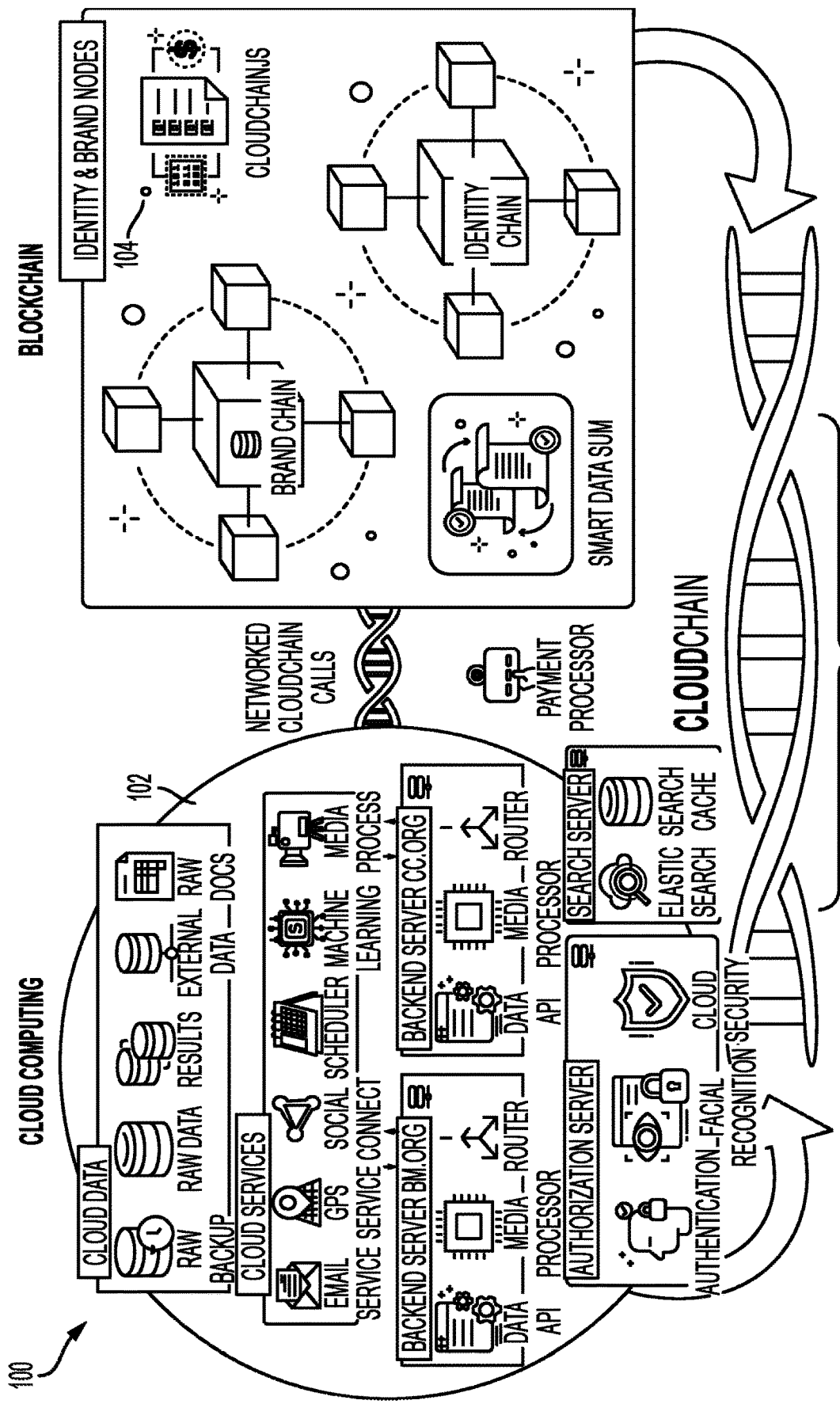
FIGS. 1A and 1B depicts a non-limiting example architecture of the described interoperable cloud-based system.

Described herein, in certain embodiments, are interoperable cloud-based systems comprising: a distributed ledger; a back-end system; and a personal computing device, configured to: provide, to the back-end system, a request for ownership of a brand, the request comprising user credentials and a data grouping; and receive, from the back-end system, a data feed comprising a plurality of opportunities associated with the brand; the back-end system configured to: receive, from a Brand Node associated with the brand, a criterion for ownership and the opportunities, the data grouping determined based the criterion for ownership; receive, from the personal computing device, the request for ownership of the brand; generate a smart ownership contract associated with the user credentials and the brand, the smart ownership contract comprising a set of instructions, which, when invoked and executed by one or more processors, cause the one or more processors to perform operations comprising: providing, to the personal computing device, the data feed based on the provided data grouping satisfying the criterion for ownership; persist the smart ownership contract to the distributed ledger; and invoke, when prompted by the Brand Node, the smart ownership contract to provide the data feed to the personal computing device.

Also described herein, in certain embodiments, are computer-implemented methods for a secure exchange of personal data with brand data comprising: receiving, from a Brand Node associated with a brand, a criterion for ownership and a plurality of opportunities, the opportunities comprising the brand data; receiving, from a computing device, a request for ownership of the brand; the request comprising user credentials and a data grouping, the data grouping determined based the criterion for ownership and comprises the personal data; generating a smart ownership contract associated with the user credentials and the brand, the smart ownership contract comprising a set of instructions, which, when invoked and executed by the one or more processors, cause the one or more processors to perform operations comprising: providing, to the computing device, a data feed based on the provided data grouping satisfying the criterion for ownership, the data feed comprising the opportunities; persisting the smart ownership contract to a distributed ledger; and invoking, when prompted by the Brand Node, the smart ownership contract to provide the opportunities to the computing device.

Also described herein, in certain embodiments, are non-transitory computer-readable storage media coupled to one or more processors and having instructions stored thereon which, when executed by the one or more processors, cause the one or more processors to perform operations comprising: providing, to a back-end system, a request for ownership of a brand, the request comprising user credentials, a data grouping, and consent for a Brand Node associated with the brand to access the data grouping, the data grouping determined based on a criterion for ownership of the brand; and receiving, from the back-end system, a data feed comprising a plurality of opportunities associated with the brand, the opportunities provided by a smart ownership contract stored to a distributed ledger and associated with the user credentials and the brand.

Also described herein, in certain embodiments, are computer-implemented methods for a secure exchange of data comprising: receiving, from a computing device, a request for ownership of a brand, the request comprising a data grouping; persist a smart contract to a distributed ledger, the smart contract associated with the brand and generated based on the data grouping satisfying a criterion for ownership of the brand; and providing, to the computing device, by executing the smart contract, a plurality of opportunities based on the data grouping satisfying the criterion for ownership. In some embodiments, the smart contract is updated based on a multi-signature model that requires receiving approval from both the brand and the computing device before a change is implemented.

Interoperable Cloud-Based System

Implementations of the present disclosure are generally directed to an interoperable cloud-based system that provides for a CloudChain Global Marketplace through a CloudChain Helix platform. The described system is the intersection of brand information stored to a distributed ledger and retrieved via high-performance cloud computing. In some embodiments, the described interoperable cloud-based system provides each user control over the details that they are sharing with their selected ("owned") brands. On the brand side, users can be targeted with media and opportunities, which can be broadcast to provide the brand with new streams of user engagement. These opportunities enhance user connections with brands that are "owned" by their respective users.

In some embodiments, the CloudChain Global Marketplace provided by the described interoperable cloud-based system targets these mutually beneficial opportunities based on Automated Digital Exclusive Branding (DEB). In some embodiments, opportunities are provided to users (who have selected to OWN the respective brands) through a Brand-Cube viewport (BrandCube) based within the CloudChain Global Marketplace.

In some embodiments, the described interoperable cloud-based system is powered by a CloudChain Helix™ Platform that converges with blockchain technology. In some embodiments, the CloudChain Helix platform employs private permissioned blockchains. Information provided through the CloudChain Helix platform can include identity information and transaction information. In some embodiments, such information is logged to a high-security distributed ledger (e.g., blockchain) for an immutable ledger of brand interaction.

Certain Definitions

Unless otherwise defined, all technical terms used herein have the same meaning as commonly understood by one of ordinary skill in the art to which this disclosure belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

The CloudChain Global Marketplace

In some embodiments, the CloudChain Global Marketplace provided by the described interoperable cloud-based system is a direct-to-consumer portal that enables consumers to access the BrandCube viewport. In some embodiments, the CloudChain Global Marketplace is the consumer point of engagement for interaction with Brands. In some embodiments, through the CloudChain Global Marketplace these brands can leverage Automated DEB to, for example, frame content, campaigns, opportunities, and other incentives, for their customer base. In some embodiments, the CloudChain Global Marketplace enhances user connections with brands by providing, for example, that above described mutually beneficial opportunities. In some embodiments, these opportunities provide a mode of interaction with each respective brand.

Automated Digital Exclusive Branding (DEB)

Automated DEB includes an automatic pairing of brands to users through, for example, machine learning. In some embodiments, Automated DEB is provided by the described interoperable cloud-based system by processes, through a trained machine learning model, a user data file, questionnaire style questions and answers, known navigation pathways, ownership requests, or related user habits, to discover new brands and provide recommendations and opportunities for exploration of these new brands.

In some embodiments, Automated DEB is provided by the described interoperable cloud-based system with display variance, which includes the changing of specified opportunities within a user's data feed. Such display variance can be determined based on, for example, a retail cycle and brand specific inputs paired with the user preferences from the Automated DEB. In some embodiments, a user data file includes personal preferences and browsing history. In some embodiments, a user data file can be extended by a user.

Personality AI Matrix and Recommendation Services

In some embodiments, the Automated DEB provided through the CloudChain Global Marketplace employs a personality matrix to filter brands provided to users based on a hybrid filtering approach that combines collaborative filtering and content filtering to give an optimal experience. In some embodiments, collaborative filtering includes recommending brands and products to a user based on the similar activities of other users. In some embodiments, artificial intelligence (AI) in the form of machine learning is employed to account for preferences entered into the personality matrix. Aspects that play into a collaborative filtering algorithm may include, for example, global/local locations, brand preferences, similar interactions, and product interest. The opportunities that are provided to the user (e.g., through the BrandCube) may be change based on the user's inputs. As an example, a user can designate to share an upcoming marriage with the brands. This data can be pushed into the personality matrix to augment the brands in which a user may be interested in and thus the opportunities provided.

Opportunity Types—Business

In some embodiments, the described interoperable cloud-based system provides business opportunities to brands and users. Such business opportunities provide a way for users to interact their favorite brands, such as applying for jobs, soliciting capital, taking advantage of affiliate marketing programs, and so forth. Example business opportunities are listed in detail below.

Opportunity Types—User

User opportunities include user-focused opportunities geared to provide a consumption-based opportunity type to users. Types of user opportunities include product catalogs, LookBook, and Retail Live. These opportunities themselves are described in detail below. In some embodiments, brands have the option of what and how much to sell as well as what tier of loyal customer can access, for example, a discounted or full-price product.

Display Variance

In some embodiments, a matrix completion algorithm in employed within the described interoperable cloud-based system to provide display variance. In some embodiments, display variance includes the continuous delivery (e.g., through the user's data feed) of fresh brands and opportunities based on a user's preferences in a pull versus push manner. In some embodiments, to provide such display variance a matrix completion algorithm is employed to predict unknown brands that a user might want to follow. In some embodiments, the provided display variance also takes in a collaborative filtering approach, and content recommendations. In some embodiments, collaborative measures brand data that is used by similar users and what such users they consider "trending" or "hot" at any given time. In some embodiments, the display variance provided by the described interoperable cloud-based system ensures that new brands on the platform are constantly being explored and exposed globally in various parts of the world. In some embodiments, this display variance is the driving force behind Automated DEB provide by the described system.

Automated Digital Exclusive Branding

In some embodiments, personalization in the CloudChain Global Marketplace is a privacy first approach that relies on personal data for processing. For example, a user can input details to a Personality Matrix for processing. The user can then set expiration dates on life events or a due date for expiration of a given set of product parameters. In some embodiments, the marketplace Automated DEB integrates this information into a recommendation engine that employs machine learning to provide detailed explorations of opportunities based on current life events and personality alignment. In some embodiments, the features that build the algorithm base are opt-in, which means that the user is automatically subscribing and determining the terms of the relationship with the brands they choose to OWN (e.g., enter into a smart ownership contract).

In some embodiments, the recommendation engine employed neural-networks and/or a Generalized Additive Model (GAM) classifier are employed to capture non-linearities in predictor sets. In some embodiments, predictor sets are employed to train a machine learning model with the residual error for a brand. In some embodiments, a predictor set includes: personal details (e.g., name, email, age, gender, and localization), family status (e.g., siblings, parents, significant others, and marital), professional personal details (resume, current job title, curriculum vitae (CV), electronic (E)-Graph, pitch data, and application history), and/or consumer inputs (e.g., "Owns", brand interactions, and opportunity transactions). These data points and sets add up to output the major predictor set referred to as "Brand Personality Matrix." In some embodiments, a classifier step function is employed through machine-learning to determine engagements on the CloudChain Global Marketplace.

In some embodiments, a classifier step function employed within the described interoperable cloud-based system is define according to:

$$\hat{r}(u, m) = r_{res}(u, m) + \alpha \begin{cases} \mu_a \text{if } p_i(u, m) < x \\ \mu_b \text{if } p_i(u, m) \geq x \end{cases},$$

where:
u is the user and m the brand being predicted;
$r_{res}(u, m)$ is the residual error of the previous classifier for that user-brand pair;
$p_i(u, m)$ is the value of predictor I for that user-brand pair;
$\mu_a$ is the average of all samples in the initial set for which $Pi < x$;
$\mu_b$ is the average of all samples in the initial set for which $Pi \geq x$;
$\hat{r}$ is the predicted score for a brand m or the predicted residual error for brand m, since the model is computed on residual errors.

Own—Brand Ownership

In some embodiments, an "own" is the subscription contract (e.g., the smart ownership contract) that a user agrees to with a brand. In some embodiments, the own, allows the user to explore the opportunities that a brand has extended. In some embodiments, brands are in control of the opportunities that they can extend via ownership. In some embodiments, ownership levels also exist, and users are rewarded based on their loyalty to their owned brands.

In some embodiments, the OWN button allows a smart ownership contract to be signed with an open pathway to the opportunities that a brand provides. This button serves as a gateway to the opportunities that a brand offers. In some embodiments, the total number of Owns is an important metric for which brands to pay attention. For example, growth in Owns and decreases in Owns can give insight to the current user sentiment (see FIG. 7).

Smart Ownership Contract

Smart contracts are digitization of the legal contracts and include executable code which represents, for example, contract terms. As such, a smart contract not only defines the rules and penalties related to an agreement in the same way that a traditional contract does, but also automatically enforces those obligations. A smart contract may accomplish this by taking information as input, assigning a value to that input through the rules set out in the contract, and executing the actions required by those contractual clauses. For example, a smart contract may determine whether an asset should be sent to a destination entity or whether it should be returned to an originating entity. Smart contacts may be coded in a programming language, such as Solidity™. For example, a smart contract may be programmed to deliver payment when an item is received. In this format, a contract is converted to computer code, stored and replicated on the system, and supervised by a network of computers that run a blockchain. Smart contracts can call other smart contract just like an Object-oriented object to create and use objects of another class. Smart contracts can store data. The data stored can be used to record information, fact, associations, balances and any other information needed to implement logic for real world contracts. In some embodiments, a smart contract is deployed, stored, and executed within the virtual machine.

A smart ownership contract is a smart contract that is created based on User—Brand interactions, incentives and rewards. In some embodiments, an ownership contract is presented to an end-user. By signing this contract with their public key, a user agrees to the terms of the contract and to extend the required data grouping (e.g., personal details and/or metrics) to the respective brand. Within a peer-to-peer opportunity channel from which both sides benefit, users and brands can propose to change the details and contents of this agreement at any time.

A data group includes a specified grouping of personal information. A data group can be tied to a smart ownership contract (e.g., the personal details and/or metrics extended to the brand from a user).

Distributed Ledger/Blockchain Overview

A distributed ledger can be described as a ledger of any transactions or contracts maintained in decentralized form across different locations and people, eliminating the need of a central authority to keep a check against manipulation. All the information on it is securely and accurately stored using cryptography and can be accessed using keys and cryptographic signatures. Once the information is stored, it becomes an immutable database, which the rules of the network govern. Distributed ledgers are inherently harder to attack than, for example, a centralized ledger because all the distributed copies need to be attacked simultaneously for an attack to be successful. Moreover, these records are resistant to malicious changes by a single party.

An example distributed ledger is the commonly known Blockchain (or blockchain). Blockchain is referenced within the present disclosure for purposes of illustration. It is contemplated, however, that any appropriate distributed ledger can be used in implementations of the present disclosure. A blockchain is a continuously growing list of records or blocks that are linked and secured using cryptography. Each block with the blockchain may include transaction data provided from transactions that have been executed in one or more contexts, such as negotiable instrument transactions, digital currency transactions, and so forth. In some examples, a transaction includes an agreement between a buyer and seller, a supplier and a user, or a provider (e.g., a brand) and a user that there would be exchange of assets (e.g., a data group), products, or services in lieu of currency, crypto-currency or some other asset either in present or in future. In some examples, a single block may include transaction data provided from multiple transactions (e.g., multiple deposits of different checks by different people). A blockchain may grow as completed blocks are added with a new set of transactions thus forming a ledger of the transaction. Each block may include a hash pointer to a previous block and a timestamp along with the transaction data in a permanent manner.

In some embodiments, the transactions in a block of a blockchain are hashed and encoded into a Merkle tree (e.g., the transactions are leaf nodes of a Merkle tree). A Merkle tree (or hash-based tree) is a hash-based data structure that is a generalization of a hash list. A Merkle tree includes a tree structure in which each leaf node is a result of a cryptographic hash function (CHF) applied to the transaction to generate a hash value or "hash" and each non-leaf node is labelled with the cryptographic hash of the labels of its child nodes. Example CHF include the secure hash algorithm 256 (SHA-256), SHA-3, and message digest 5 (MD5), among others. In general, the CHF receives information as input, and provides a hash value as output. The hash value can be a predetermined length. For example, SHA-256 outputs a 256-bit (32-byte, 64-character) hash value. In some examples, the hash value is a one-way hash value, in that the hash value cannot be 'un-hashed' to determine what the input was. Additionally, a Merkle tree may be implemented as a k-ary tree, which is a rooted tree data structure in which each node has no more than k children. For example, a Merkle tree may be implemented as binary tree where each node may have 0, 1, or 2 children. The Merkle root (or root hash) of such a binary tree can be generated by repeatedly hashing each pair of nodes until only one hash is left. In some examples, when the number of transactions is odd, the last hash is duplicated once to create an even number of leaf nodes. If a single detail in any of the transactions or the order of the transactions changes, so does the Merkle root. As such, the Merkle root summarizes all of the data in the related transactions, and can be stored in a block to maintain the integrity of the data. Thus the employment of a Merkle tree allows for a quick and simple test of whether a specific transaction is included in the set or not.

In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, entities must agree on which transactions have actually occurred, and in which order. For example, if two entities observe different transaction histories, they will be unable to come to the same conclusion regarding the validity of a transaction. The blockchain enables the entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

A typical peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a PoW before their proposed block of transactions is accepted by the peer-to-peer network. A blockchain protocol includes a PoW scheme that is based on a CHF. In some embodiments, the blockchain protocol can require multiple pieces of information as input to the CHF. For example, the input to the CHF can include a reference to the previous (most recent) block in the blockchain, details of the transaction(s) that are to be included in the to be created block, and a nonce value.

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In a blockchain-based smart contract platform, for example, each block producing node may go through a number of steps to create a candidate block. For example, a number of transactions are selected from a publicly-shared pool of pending transactions. In some embodiments, the selected transactions are assigned in an order in, for example, a linear list. Typically, there is some mechanism to limit the maximum number of transactions that can be included. In many embodiments, however, there is no enforced minimum. Computations specified by the transactions are performed. In some embodiments, each computation has access to a global shared state, and can make certain changes to that shared state. Moreover, in some embodiments, the input of one transaction could depend on the output of another transaction. In such embodiments, it is important that these computations are strictly performed in order. The transactions are combined with a snapshot of the final global state resulting from processing those transactions. The results are broadcast to the rest of the network. In some embodiments, the "snapshot" is a hash of the global state, and can be in the form of, for example, the root node of a Merkle tree.

In some embodiments, each node in the network that receives a candidate block verifies that the computations implied by the transaction list have been computed correctly. These nodes re-perform all of the computations in the order specified by the candidate block. The nodes then compare the snapshot of the final global state they have computed with the snapshot in the candidate block from the original node. If the snapshots match, the block is considered a valid candidate.

Public blockchains are decentralized where no one body has control over the network, ensuring the data cannot be changed once validated on the blockchain. Some well-known examples of Public Blockchains would be Bitcoin and Ethereum. In unspent transaction output (UTXO) blockchains, such as Bitcoin, only transactions that successfully transfer tokens can be included in a block. On the other hand, in state-model blockchains, like Ethereum and Zeus, it is valid (and even common) to include transactions that fail. In some embodiments, these transactions are included in the block, but do not modify the global state (aside from the payment of the transaction fees). Thus, a transaction that is "processed correctly" may not actually do what was intended by user initiating the transaction.

A private blockchain is a permissioned blockchain. Permissioned networks place restrictions on who is allowed to participate in the network and in what transactions. Blockchains that are private or permissioned work similarly to public blockchains but with access controls that restrict those that can join the network, meaning it operates like a centralized database system of today that limits access to certain users. Private blockchains also have one or multiple entities that control the network, leading to the reliance on third-parties to transact.

Once one or more valid candidate blocks are produced, the network uses some consensus mechanism for collectively agreeing on a single valid candidate. This is typically "proof-of-work" in current blockchains, but there are many proposals for future networks—or evolutions of existing networks—that use "proof-of-stake". The embodiments decentralized computation system, described herein, work equally well with either family of consensus mechanisms, but is most powerful when coupled with instant-finality, proof-of-stake consensus.

CloudChain Helix Platform™

In some embodiments, the described interoperable cloud-based system is provided through a CloudChain Helix Platform. Such a platform allows, for example, a user to register securely and maintain their personal records transparently to share the records through smart ownership contracts with their favorite brands. Additionally, through the described system provided by the CloudChain Helix Platform users can interact and exchange personal preferences and information with brands.

Figure 1B:
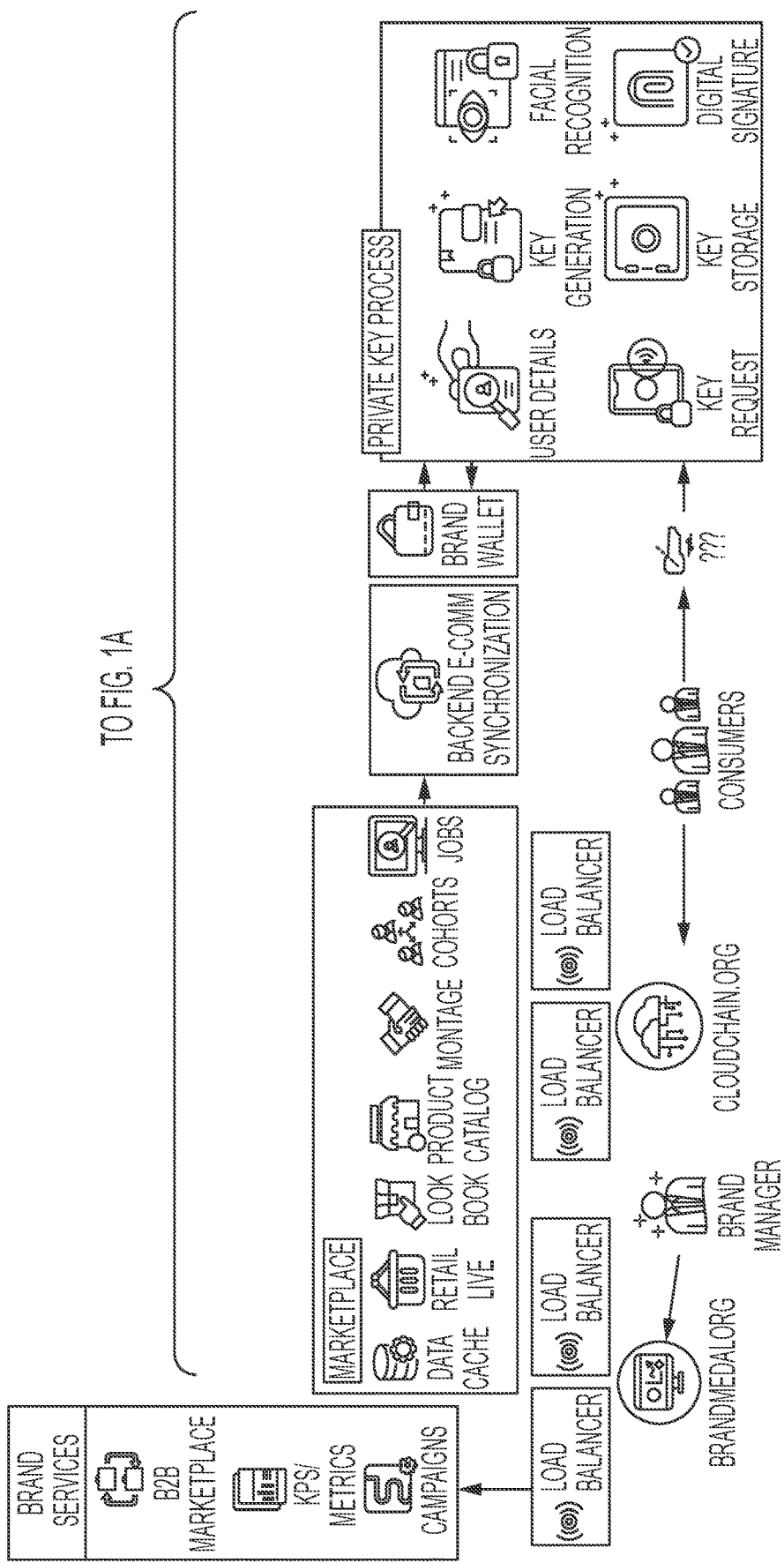

FIGS. 1A and 1B depicts an example architecture 100 for the CloudChain Helix Platform. The example architecture 100 provides the described system that allows brands to build opportunities for users in the cloud while these users securely interact with the opportunities via a blockchain. The CloudChain Helix Platform allows users to exchange personal data, which is secured cryptography via a blockchain, with brand data that is stored in the cloud. In some embodiments, each user can build their own experience through the described system provided by the CloudChain Helix Platform by interacting with, saving, and owning brands. In some embodiments, through the described system provided by the CloudChain Helix Platform, brands can extend opportunities tailored to user preferences while ensuring data security, privacy, and high performance for the end-user.

As depicted, the example architecture 100 employs cloud computing resources 102 and various blockchains 104. As depicted, the cloud computing resources 102 includes cloud data, cloud services, backend server BM.org, backend server CC.org, authorization server, and search server. As depicted, cloud data includes raw back up, raw data, results, deriver data, and raw logs. As depicted, cloud chain services include email services, Global Positioning System (GPS) service, social connect, scheduler, machine learning, and media process. As depicted, backend server BM.org includes data API, media processor, and routers. As depicted, backend server CC.org includes data API, media processor, and routers. As depicted, authorization server includes authentication, facial recognition, and cloud security. As depicted, search server includes elastic search and search cache. As depicted, the cloud computing resources 102 and the blockchains 104 are connect via network CloudChain calls and through a payment processor.

As depicted, the blockchains 104 include a brand chain, a cloudchain.js, smart data sum, and an identity chain and are labeled as identity and brand nodes. As depicted, the example architecture 100 also includes a brand services, a market place, a brand wallet, and a private key process.

As depicted, the brand services and market place are load balanced. As depicted, the brand services include a business-to-business (B2B) marketplace, key performance indicators (KPIs) and metrics, and campaigns. As depicted, the marketplace includes, data cache, retail live, LookBook, product catalog, montage, cohorts, and jobs. The marketplace is synchronized via backend e-commerce synchronization. As depicted, the example architecture 100 allows consumers to cloudchain.org to communicate with brand mangers through key encryption. As depicted, the example architecture 100 allows brand managers to communicate with brandmedia.org.

As depicted, the private key process includes user details, key generation, facial recognition, key request, key storage and digital signature.

The described interoperable cloud-based system provides ultra-high-performance cloud capabilities through a global-tenant model built for speed and scalability. The CloudChain Helix™ Platform uniquely blends this multitenant cloud with the security and data privacy of blockchain technology. In some embodiments, CloudChain Helix™ Platform employs a permissioned blockchain that is held up by a consortium of subscribing brands hosting their own Brand Nodes. In some embodiments, brand nodes are dynamic systems of verifying bodies and storage house for the smart ownership contract held between brands and users. In some embodiments, the CloudChain Helix platform cryptographically signs data into secure blocks to consolidate the data. In some embodiments, the blocks are accessible only through discrete Brand Nodes and User Nodes interfaces that employ a multi-signature model. In some embodiments, the employed node regime establishes the benchmark for industry and regulatory standards in data and privacy at a global level.

In some embodiments, the described interoperable cloud-based system includes a pool of redundant computing infrastructure, from which data, products, and service infrastructure can be accessed, provisioned on request, and released when not required—within a globally scalable application runtime environment. The CloudChain Helix Platform provides several APIs such as a stream of subscription-based opportunities guarded by an authoritative Blockchain. In some embodiments, the authorization process for the described system includes an Identity Blockchain, PublicKey Cryptography and intelligent routing specified to a user's credentials. In some embodiments, the CloudChain Helix Platform serves content and media from secure contracts between users and brands while providing encrypted communication channels. In the depicted example, the cloud converges with the decentralized and distributed private Blockchain solution to form the CloudChain Helix Platform.

In some embodiments, the CloudChain Helix Platform provides a set of available services routed by a secure gateway API that directs user credential (e.g., a unique identifier(s) public key(s), and so forth) to a Hyperledger Blockchain and keeps brand data self-contained under each individual Brand Node. The CloudChain Helix Platform employs secure networking and supports controlled social sharing by users (e.g., via a Viral Sharing Button™). The CloudChain Helix Platform helps users maintain their feeds of, for example, brands, commerce, and opportunities, using the brand wallet, and by tracking transactions on our platform.

Global-Tenant Cloud Architecture

Figure 2:
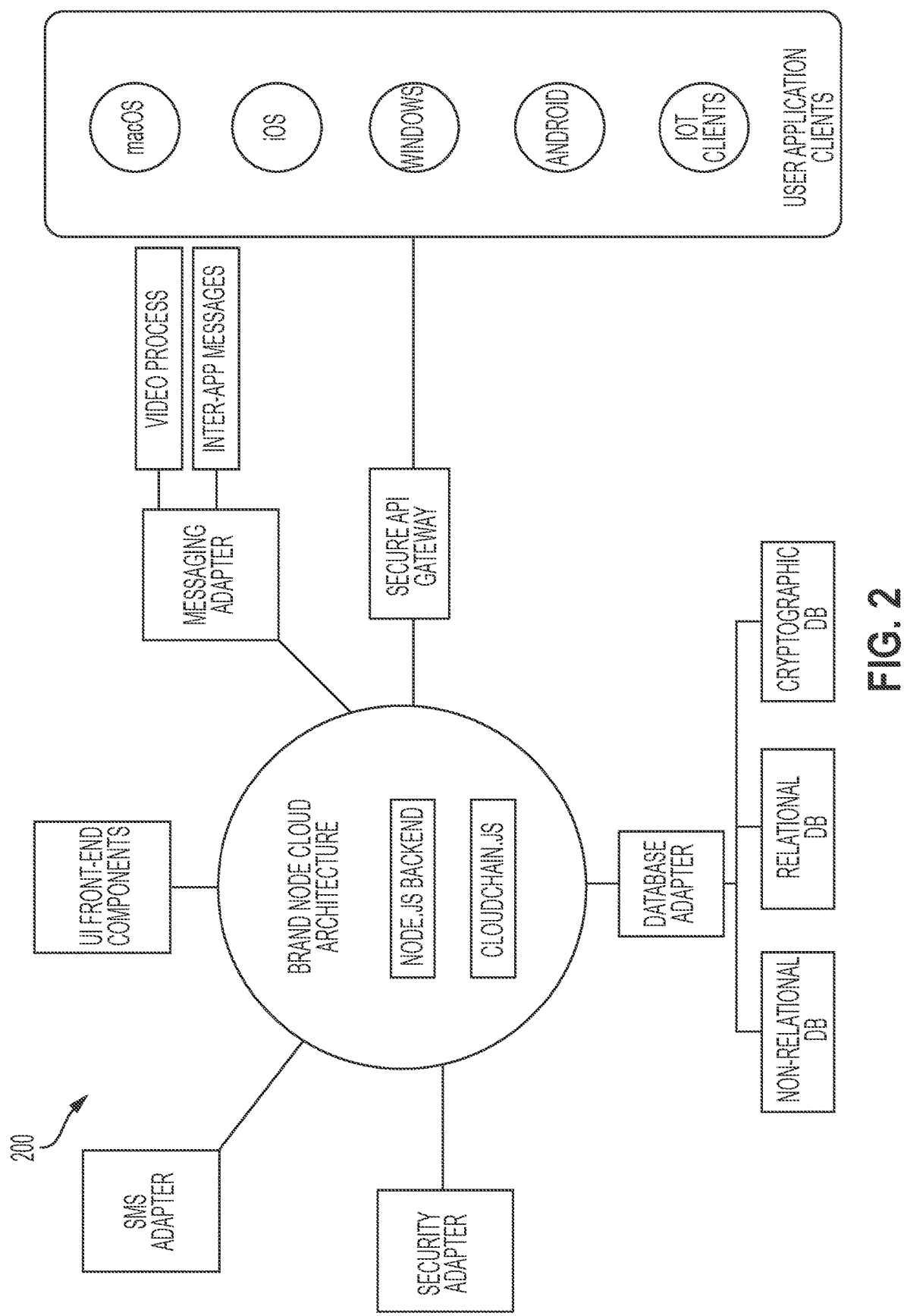
FIG. 2 depicts a non-limiting example of a high-level application instance model.

FIG. 2 depicts an example a high-level application instance model (global-tenant) 200 that launches new branded nodes for each on-boarded brand entity. As depicted, the global-tenant model 200 includes, a brand node cloud architecture that is connected to a security adapter, a short messaging service (SMS) adapter, user-interface frontend components, messaging adapters, a secure API gateway, and database adapters. As depicted, the messaging adapters connect the brand node cloud architecture to a video process and inter-application messaging. As depicted, the database adapters connect the brand node cloud architecture to non-relational databases, relational databases, and a cryptographic databases. As depicted, secure API gateway connects the brand node cloud architecture to user application clients, such as macOS™, iOS™, Windows™, Android™, and internet of things clients.

Through this global-tenant model 200, brands can populate content, access data and tap networks at any desired scale. In some embodiments, application instances are generated and replicated horizontally around the globe based on, for example, request times, location of requests, and the status of each application instance cache. In some embodiments, global caches are employed to provide an optimal user experience. In some embodiments, brand nodes work together to secure the network and verify the transactions of the entire platform.

The depicted Global-tenant architecture 200 leverages high scalability and security through cloud based services. In some embodiments, brand data APIs are accessed via user authenticated identity. In some embodiments, the described system employs an IDKey that is a decentralized identity system that provides the mechanisms needed for public key cryptography. In some embodiments, a UPI is assigned to each user.

Data feeds provided by various brands are programmed and consumed in a number of ways in accordance with respective brand data policies. As an example, a brand may fill out a Brand Catalog, queue up a product launch via LookBook or extend open career opportunities via Jobs. In some embodiments, these opportunities are only able to be accessed by authenticated users who have agreed to the smart ownership contract of the Brand. In some embodiments, when the criteria of ownership are agreed and signed upon with an authorized IDKey identity, the user is able to access the respective brand opportunity feed through the BrandCube provided by the CloudChain Helix Platform.

In some embodiments, Secure Sockets Layer (SSL) is used to automatically generate SSL certificates to keep every Brand Node SSL connection up to date in real-time. The SSL encryption fully encrypts the access to Brand Nodes on the system.

In some embodiments, brand data APIs are secured and allow access to data that is provided by the respective brands. In some embodiments, brand data is syndicated through secure APIs for authorized parties to view and take advantage of regardless of platform. In some embodiments, each brand configures campaigns through a scheduler application, which is a campaign coordinator that employs collision detection and machine learning to determine the best times to schedule content around a given topic, geographical reach, media type, consumption details, and retail cycle.

Retail Live Geo-Location API

In some embodiments, a Geo-Location API is provided to Brand Nodes through the Global-tenant architecture 200. In some embodiments, a Geo-Location API is used in Retail Live to perform a verification check at various locations to provide real-time incentives these locations. In some embodiments, the Retail Live Geo-Location API is a cloud based service that is accessible to Brand Nodes. For example, as a user enters a storefront, they can use their precise GPS coordinates to verify with the brand in real-time that they are at the brand's event, office, or anywhere else of interest to the brand and/or user. In some embodiments, a communication stream of incentives and other opportunities are continuously extended to the user via the Geo-Location API. In some embodiments, being a permission-based system, users are notified by their devices and CloudChain that a choice Brand is accessing their location.

Use of Blockchain Technology

Figure 3:
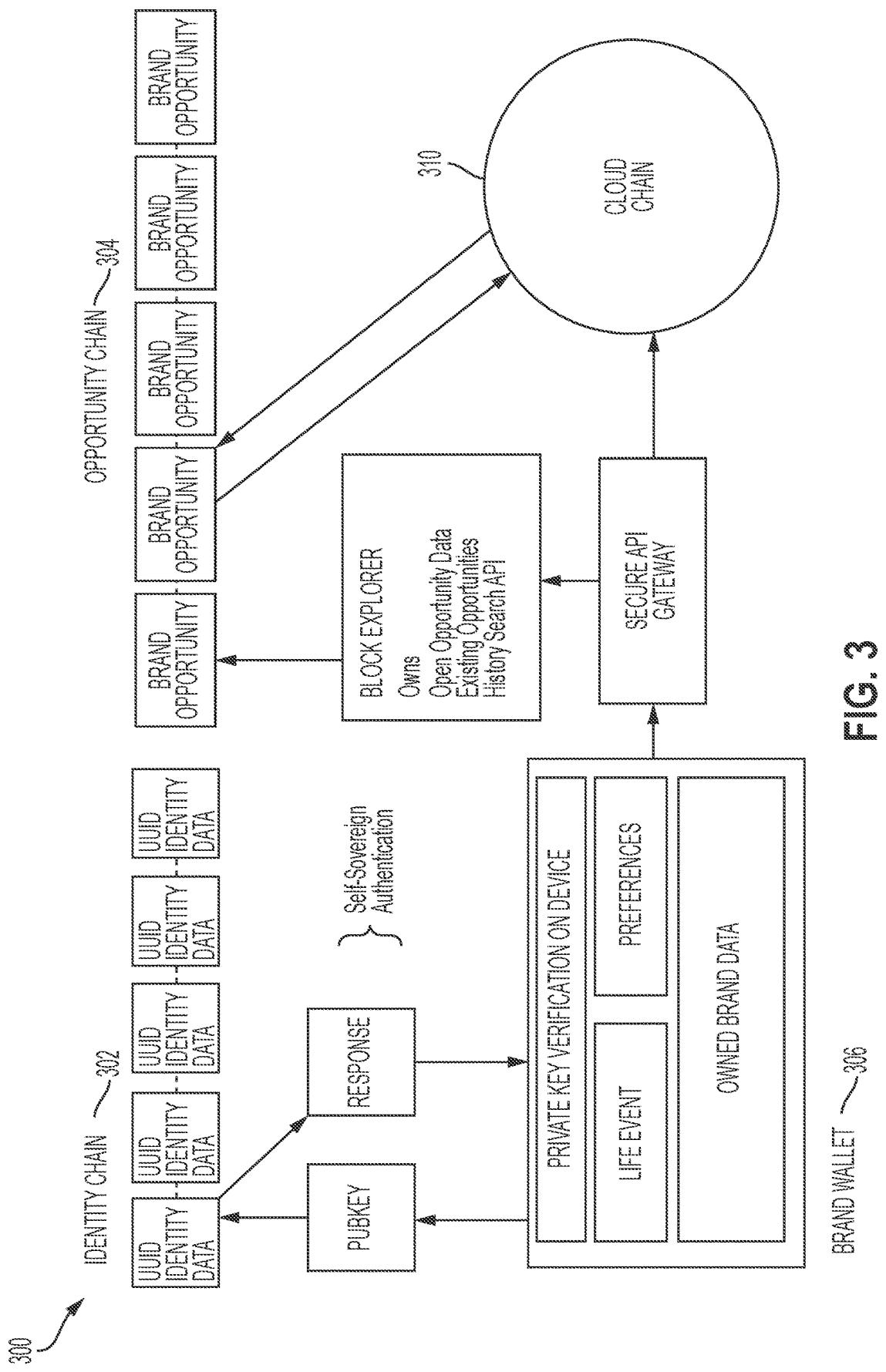
FIG. 3 depicts a non-limiting example blockchain instance architecture.

FIG. 3 depicts an example blockchain instance architecture 300 that provides a brand wallet 306 interaction and identity authentication through the CloudChain Helix Platform, depicted as the CloudChain 310. As depicted, the blockchain instance architecture 300 includes an identity chain 302 and an opportunity chain 304. In some embodiments, the identity chain 302 is employed to authenticate and verify legitimacy of users using Zero Knowledge Succinct Non-Interactive Argument of Knowledge (SNARK). In some embodiments, SNARK allows the proof of an identity, secret data, etc. to be proved without revealing that information between a verifier and proving person. In some embodiments, the opportunity chain 304 allows brands to log opportunity transactions and expose their immutability, searchability, and history. In some embodiments, the transactions take place over a Secure API Gateway where users can access the immutability, searchability, and history via a block explorer, which is authenticated by their brand wallet.

Blockchain Use-Cases

The employed blockchains provides peer-to-peer connectivity, data privacy, and security. In some embodiments, blockchains are employed to store encrypted identity information encrypted that allows users to engage in smart ownership contracts with brands without the need of revealing their true identities without permission. In some embodiments, each transaction is logged to the blockchain using the IDKey protocol. In some embodiments, the IDKey protocol uses user credentials, such as the user's public key and unique identifier, which may be generated upon registration. Identification Key (IDKey) is a self-sovereign identity process that a user employs to secure their personal information on the CloudChain Helix platform.

Figure 4:
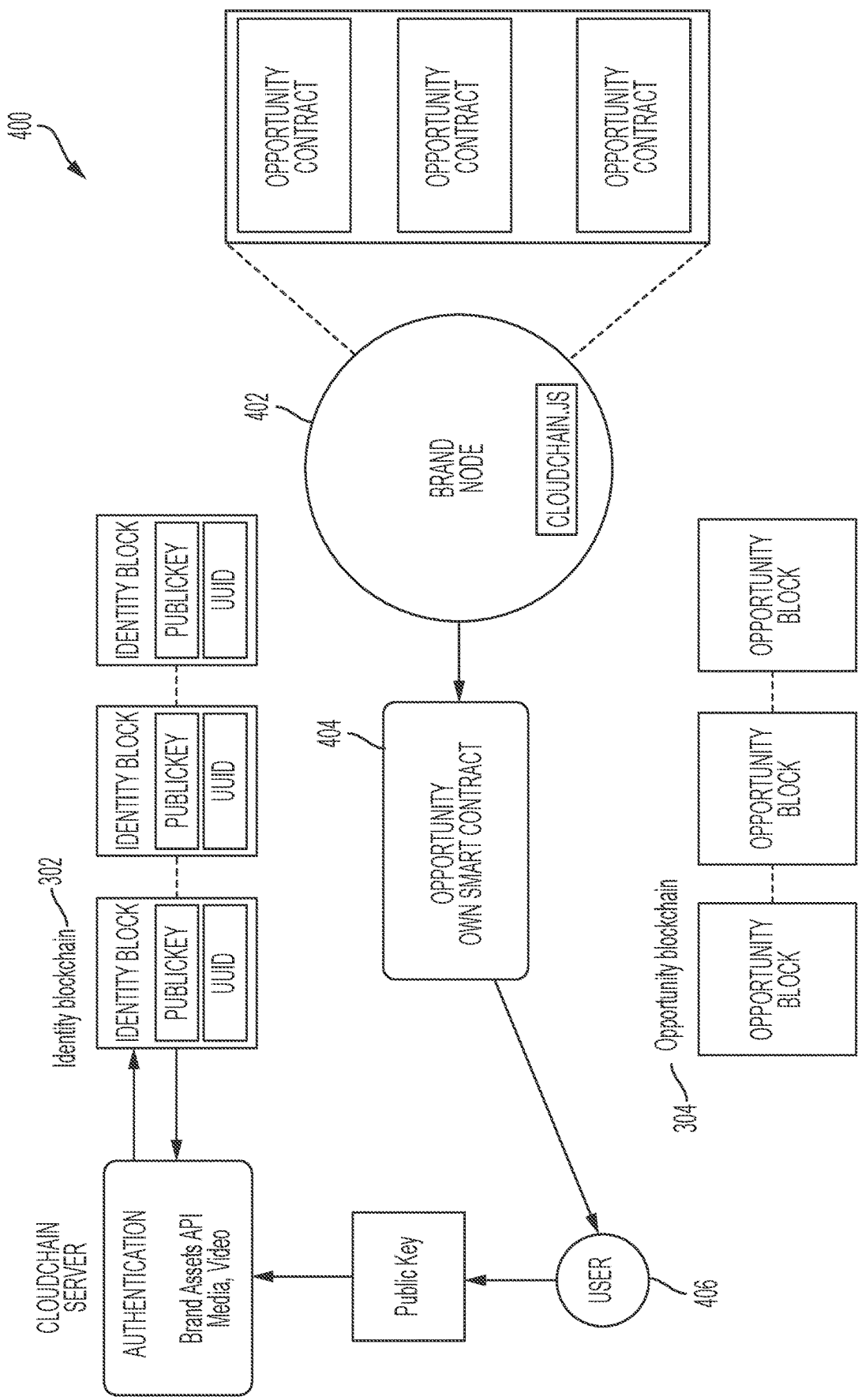
FIG. 4 depicts a non-limiting example process of a Brand Node extending opportunities through a smart ownership contract.

FIG. 4 depicts an example process 400 of a Brand Node 402 extending opportunities through a smart ownership contract 404. In some embodiments, the Brand Node 402 generates the smart ownership contract 404 for the user 406. In some embodiments, the smart ownership contract 404 act as an application that can programmed, for example, through a UI. In some embodiments, a brand can extend smart ownership contracts, such as the smart ownership contract 404, to their users, such as user 406. In some embodiments, the user 406 authenticates using the Identity Blockchain 302 and Public Key Infrastructure required for access to the specific data. In some embodiments, this opportunity transaction, including the ownership, is logged on the Opportunity Blockchain 304. Once a smart ownership contract, such as the smart ownership contract 404, is generated between a user and a brand, the respective user has exclusive access to pass personal details and requested data groups to the Brand.

In some embodiments, smart ownership contracts, such as the smart ownership contract 404, are executed as channels between a Brand and a user. Such channels allow the free-flow of information between the two parties as a peer-to-peer communication flow and provide the incentives promised. In some embodiments, each party involved in a smart ownership contract must endorse the contracts as defined within an extended opportunity. The endorsement states what the identity (e.g., the user) and the organization (e.g., the brand) are required to sign off on to execute the contract. In some embodiments, the user and the brand are both required to sign the transaction of opening a new ownership contract via an ownership contract endorsement. In some embodiments, once both ends of the contract are signed by the brand and the user, the user has access to the brands extended opportunities and can exchange data groupings with the brand and the brand can propose new opportunities, incentives, or data rules through the Ownership Contract.

Figure 5:
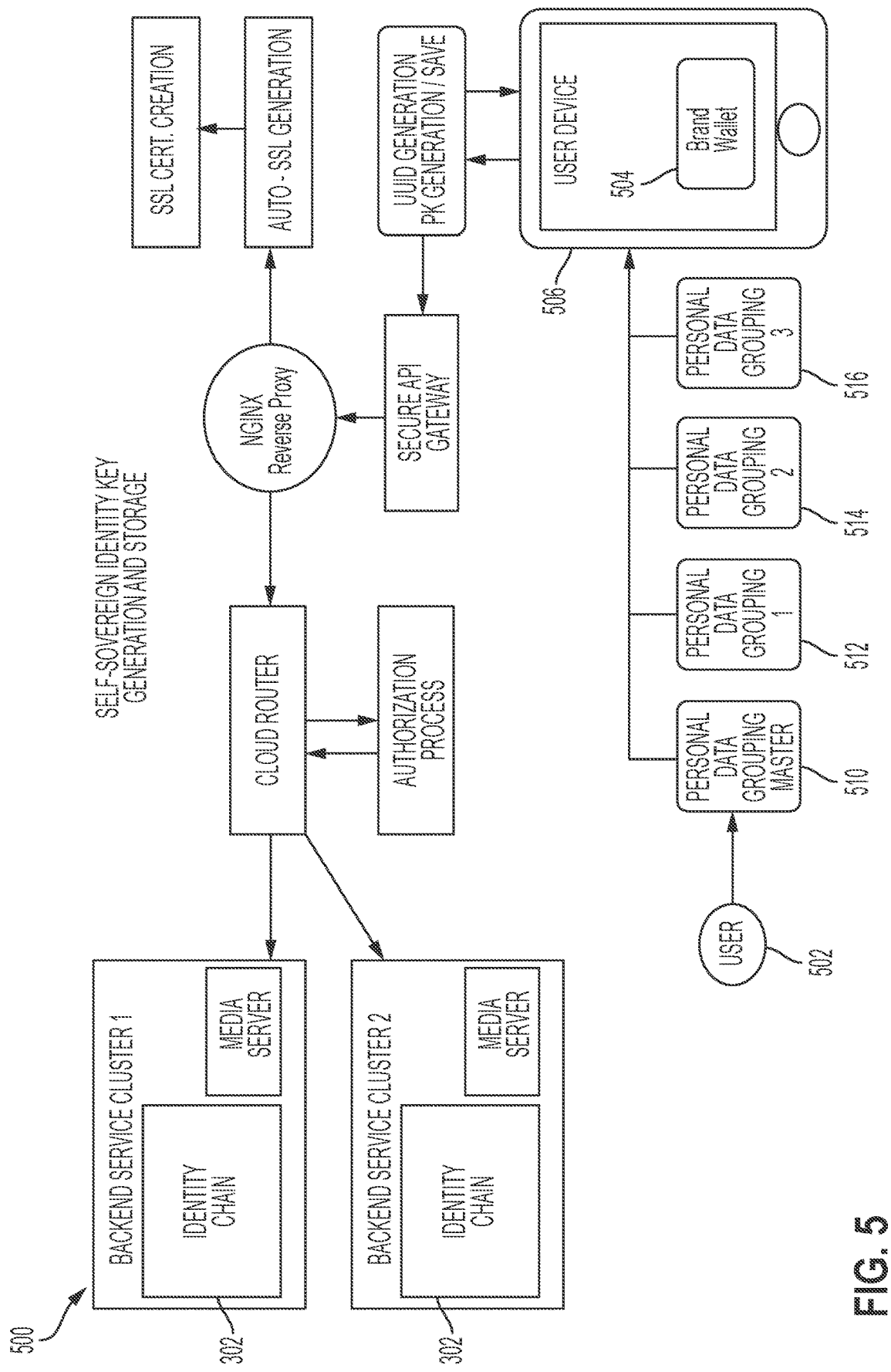
FIG. 5 depicts a non-limiting example process for self-sovereign identity key generation and storage.

Private Key Generation Process—Self-Sovereign Identity Private Key Infrastructure FIG. 5 depicts an example process 500 for self-sovereign identity key generation and storage. As depicted, a user 502 initiates an application to generate a private-public key pair. In some embodiments, the generated private key is stored on the user's personal device 506 accessible by brand wallet 504 running on the device 506. In some embodiments, a UPI is generated and grouped with the Public Key to be saved on the Identity Chain 302 as an identifier for later lookup processes. In some embodiments, a seed key for backing up a user's credential is generated. In some embodiments, such a seed key can be used to restore the account in question and unlock the brands and opportunities that are saved to that digital identity.

In some embodiments, following the identifier being created and logged into the identity chain 302, a user creates a Master Data Group 510 that includes personal details that a user can derive into subsequent data groupings (e.g., data groupings 512, 514, and 516). In some embodiments, the Master Data Group is stored on a personal computing device and subsequent sharable groupings are encrypted and placed on-chain. In some embodiments, the public key becomes a pointer in the chain to be found with the Block Explorer. Data can now be encrypted and stored on the blockchain through the user's credentials. In some embodiments, a user employs the identity chain service to generate a private—public key pair. In some embodiments, the private key gets saved to their device in an encrypted file.

In some embodiments, a user enters personal details into the Master Data Group for their profile. In some embodiments, this Master Data Group is stored on file and during the initial creation of credentials, such as a UPI or other unique identifier, as well as a seed key for recovery. In some embodiments, optional personal data groupings are able to be formed for sharing purposes or entry into a smart ownership contract with choice brands. In some embodiments, facial recognition and biometrics are used to secure the file on the user's personal device. In some embodiments, public keys are posted to the secure API gateway.

In some embodiments, the back-end cloud router routes the traffic to the correct CloudChain application instance and data store. In some embodiments, the public key and unique identifier point at the user's identity for verification. In some embodiments, data is encrypted and stored on the identity chain with the UPI and Private Key for access to the data groups that have been created.

In some embodiments, a combination of Merkle DAGs and digital signatures are used to verify the integrity of an end-user's personal privacy data. In some embodiments, a private key stored by the user on their device allows for the access to that data. For example, each user can generate a specific public address that allows exposure of given personal profile details in order to allow an authorized party to use their private key to open/decrypt that data. In some embodiments, identity can persist across devices by utilizing a seed, image-based connection or private key.

In some embodiments, users are able to protect their personal details behind a profile based facial recognition authorization that accesses their transactions and personal details on their personal device. In some embodiments, this facial authentication can be used as a way to secure private keys on a device. In some embodiments, a facial recognition algorithm assigns a seed keyword to each point that is recorded by a camera, which can be used together with the users face to unlock an account from any device.

Showcase Immersion Algorithm

In some embodiments, on application initialization a user and their active brands are initialized for the navigation and queue of CloudChain brands. In some embodiments, a showcase immersion algorithm is employed to keep the flow of fresh opportunities front and center to each user. In some embodiments, the brands selected as active for a user are based on, for example, brands owned by the use (e.g., determined via the user's brand wallet) and via the collaborative filtering algorithm as well as brands determined based on accessible user data, such as, the active user's age, gender, personality traits, logins, registrations, payments. In some embodiments, users are shown a mixture of brand opportunities based the showcase immersion algorithm processing these active brands. In some embodiments, users are shown owned brands with the most recent consumer opportunity determined based on the showcase immersion algorithm. In some embodiments, certain global states may pause or interrupt the showcase immersion algorithm. Such global states may include, for example, interacting with a media player, call to action, global searches, choosing a trending opportunity to populate, interacting with any system cube (e.g., ledger, or brand wallet,), viral button, brand story, ownership, and opportunity buttons. The constant feed of brands presented to a user, as determined based on the showcase immersion algorithm, immerses the user in new brands with a blend of the familiar favorite brands.

In some embodiments, each user employs a public key authentication method that interfaces with the identity chain to form a response that unlocks a personal profile assigned to the user. In some embodiments, this profile contains private data pertaining to the authenticated user. In some embodiments, the showcase immersion algorithm uses, for example, past owns, active life events, geography, dislikes and active world events, and the brad wallet of owned brands to generate a showcase view for the user. In some embodiments, the showcase view is a BrandCube Viewport that a user may interact with when the user initially authenticates to the CloudChain Global Marketplace. In some embodiments, the showcase immersion algorithm generates an owned brand opportunity followed by an explore (e.g., an unowned brand) opportunity to deliver a constant flow of new and existing brands with which to the user to may interact. In some embodiments, the data determined by the showcase immersion algorithm is employed to retrain (e.g., via machine learning) the algorithm to better understand what brands to showcase for each user.

Collaborative Filtering Example

Figure 6:
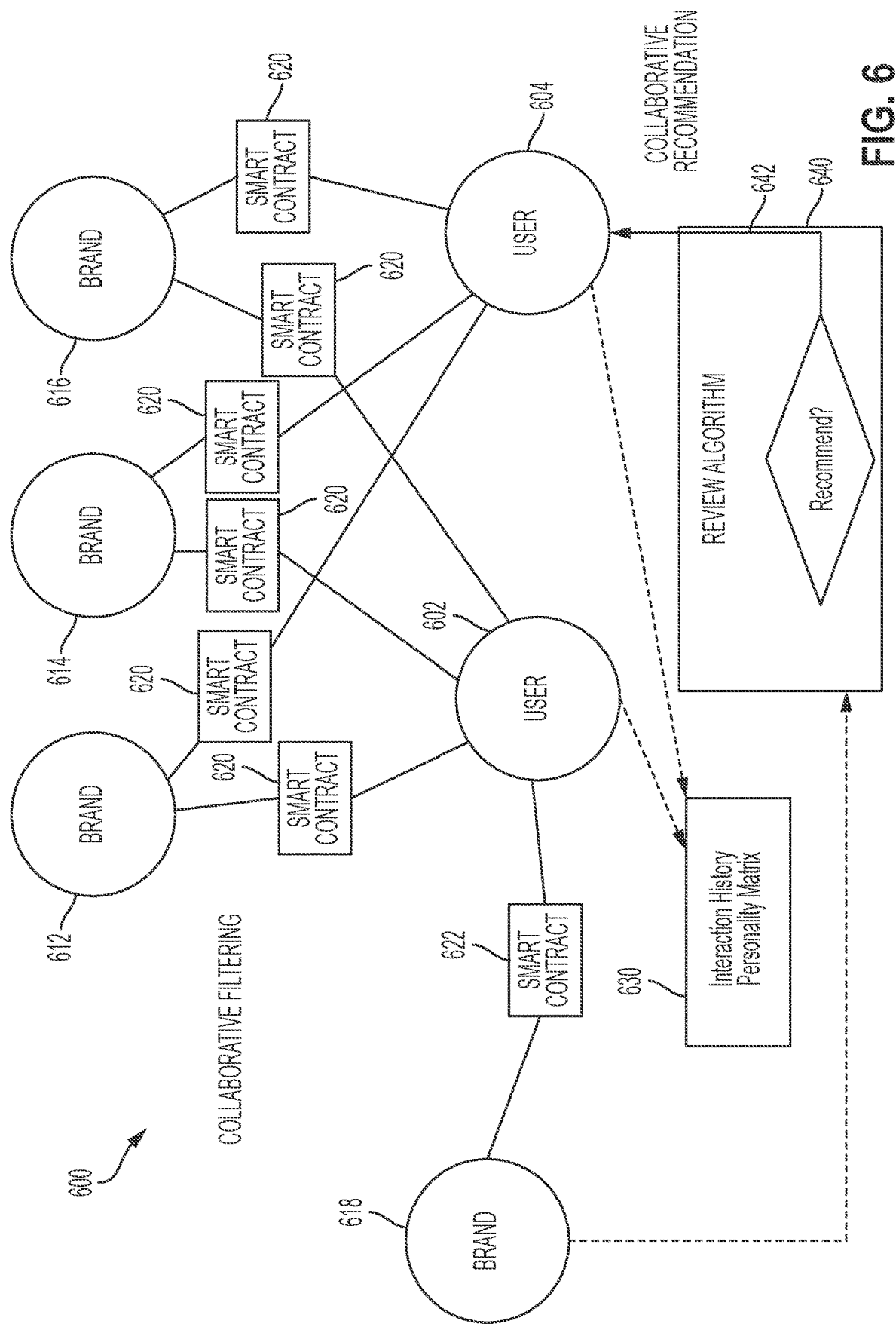
FIG. 6 depicts a non-limiting example collaborative filtering example with conflict review.

FIG. 6 depicts a collaborative filtering example with conflict review. As depicted, user 602 and user 604 who share common connections and personal data smart contracts 620 with brands 612, 614, and 616. As depicted, user 602 has a singular connection (data smart contract 622) with brand 618 that is not approved by user 604. In some embodiments and as depicted, a collaborative recommendation 642 is generated by a conflict review algorithm 640 based on an interaction history and personality matrix 630. In some embodiments, the conflict review algorithm 640 runs through the personality matrix 630 providing personal preferences, life events, and past feedback that are provided via interaction methods. As an example, if a user has a signified a life event, such as "Purchased a Home," then a furniture company would be a "Good Recommendation." In some embodiments of the conflict review algorithm 640, a number of sets are blended using a linear regression model specific to each user. In some embodiments, a linear regression of predictions is generated based on samples from an initial set. In some embodiments, the linear model is trained specific to each user preference using ridge regression, which minimizes the expression.

Transaction Logging

In some embodiments, the transactions that take place between the brand and user are logged on a shared private permissioned blockchain. As users take advantage of opportunities that are extended via the brands, final actions are logged in an immutable ledger. This ledger can be accessed by brands and users via the CloudChain Helix Platform.

Figure 7:
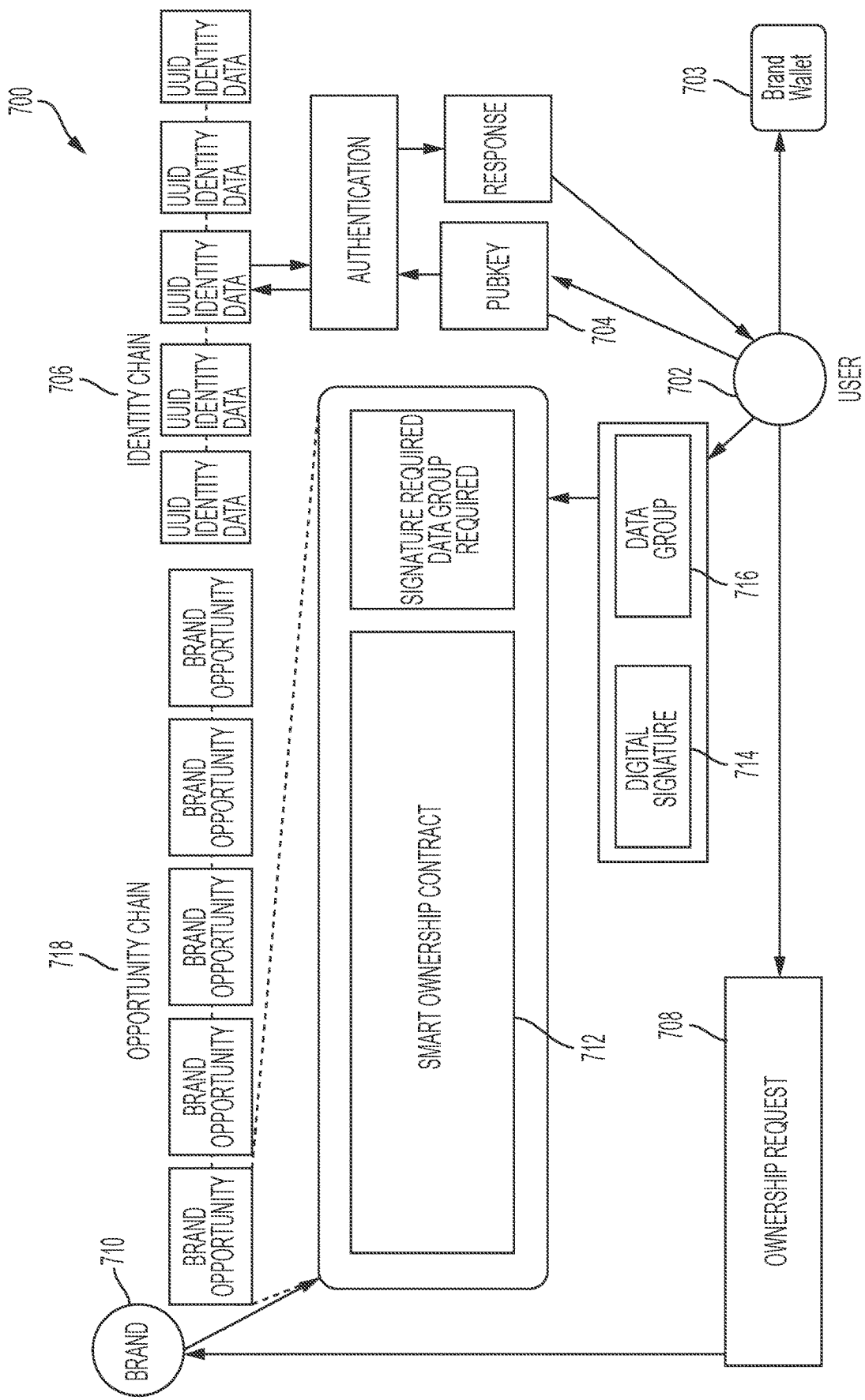
FIG. 7 depicts a non-limiting example ownership request process.

FIG. 7 depicts an example ownership request process 700. As depicted, a user 702 completes a public key 704 generation process to generate a pointer to which to sync data. The private key is stored to the user's brand wallet 703. The user's 702 identity is verified by the Identity Blockchain 706. Once verified, an ownership request 708 is provided to a brand 710 by pressing the OWN Button. The brand 710 extends the smart ownership contract 712. The smart ownership contract 712 includes a request for a digital signature 714 and a data grouping 716 (that satisfies criteria for ownership provided by the brand) to be provided by the user 702. The user 702 provides the digital signature 714 to sign the smart ownership contract 712 and chooses a data grouping 716 to extend back to the smart ownership contract 712. The smart ownership contract 712 completes and gives the user 702 the reward. A block is created on the opportunity blockchain 718 that includes the encrypted data behind the transaction (e.g., the smart ownership contract 712, the digital signature 714, and the data grouping 716. In some embodiments, the data stored to the opportunity blockchain 718 is only able to be viewed and un-encrypted by the two originators of the contract (e.g., the brand 710 and the user 702). In some embodiments, a Block Explorer provided by the described interoperable cloud-based system allows the user 702 to review the details of all transactions with brand opportunities.

High Performance Bandwidth

In some embodiments, brands employ a respective brand node that provide request caching and subscription updates that allow each brand to be independent from other brands bandwidth. In some embodiments, each brand node includes its own limit and does not share resources with the rest of the platform. In some embodiments, each brand node handles requests via a Secure API and return brand API to provide data quickly to interested parties.

Figure 8:
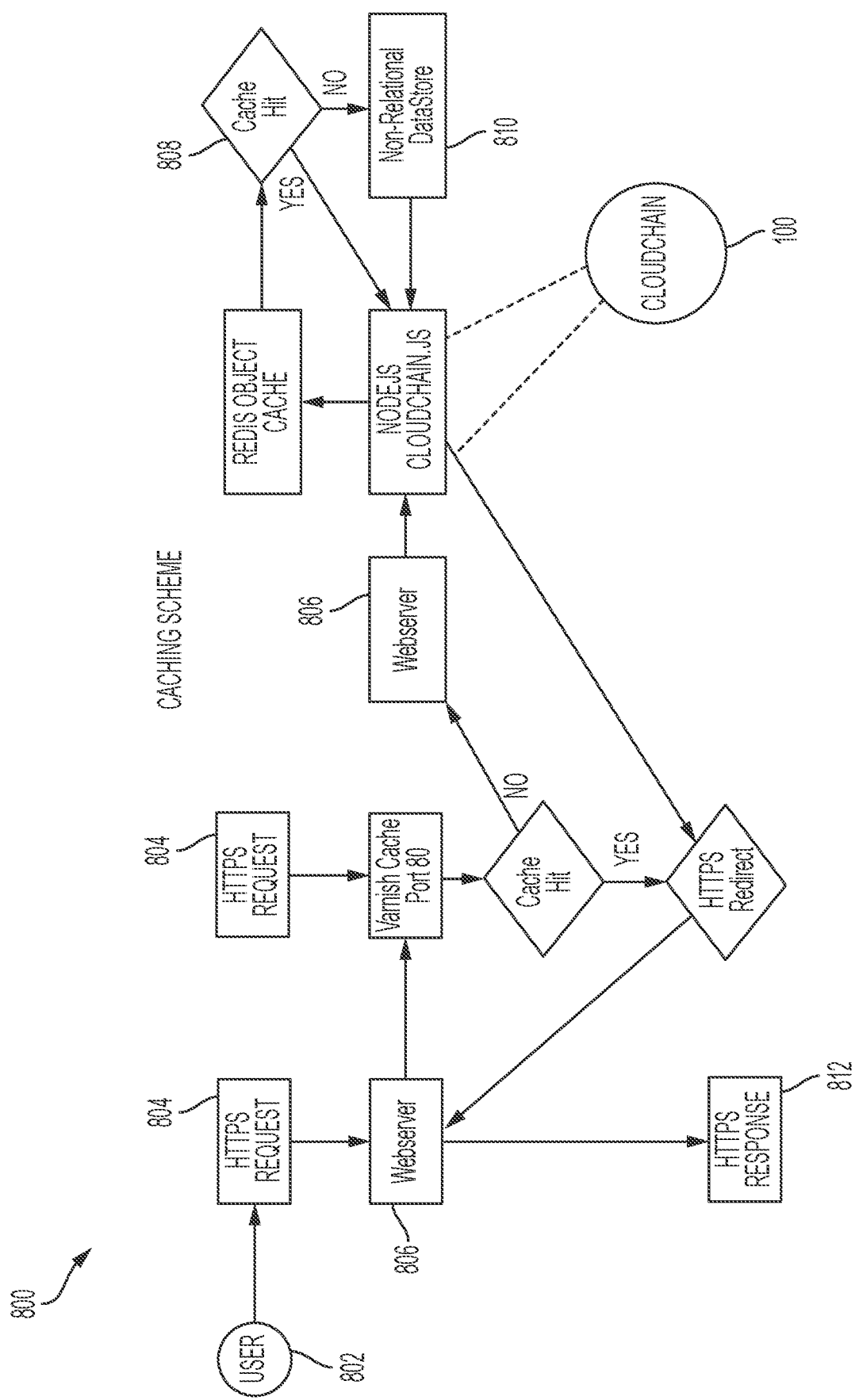
FIG. 8 depicts a non-limiting example caching scheme.

FIG. 8 depicts an example caching scheme 800 that can be employed within the described interoperable cloud-based system. As depicted, a user 802 make secured or insecure request 804 to the CloudChain Helix Platform via http/https. A webserver 806, such as a NGINX, reverse proxies the requests to a cache system. The cache will return 808 if it can quickly deliver assets. If not, the webserver accesses an object storage 810. The cache is checked if it can return assets at this level and if it cannot it will read the database and return data. If Cache is good then it will deliver a response 812 over redirected Hypertext Transfer Protocol Secure (HTTPS) and user cached for next time.

BrandCube Viewport

In some embodiments, the BrandCube provides the core brand opportunities to the users and is the viewport into the interactions that take place on CloudChain Global Marketplace. In some embodiments, the BrandCube provides a mode of interaction with the opportunities extended by brands. In some embodiments, the BrandCube includes interactive call to action buttons and brand specific details. In some embodiments, a user profile is center to the BrandCube and is displayed as a large avatar for logged in user.

Figure 10A:
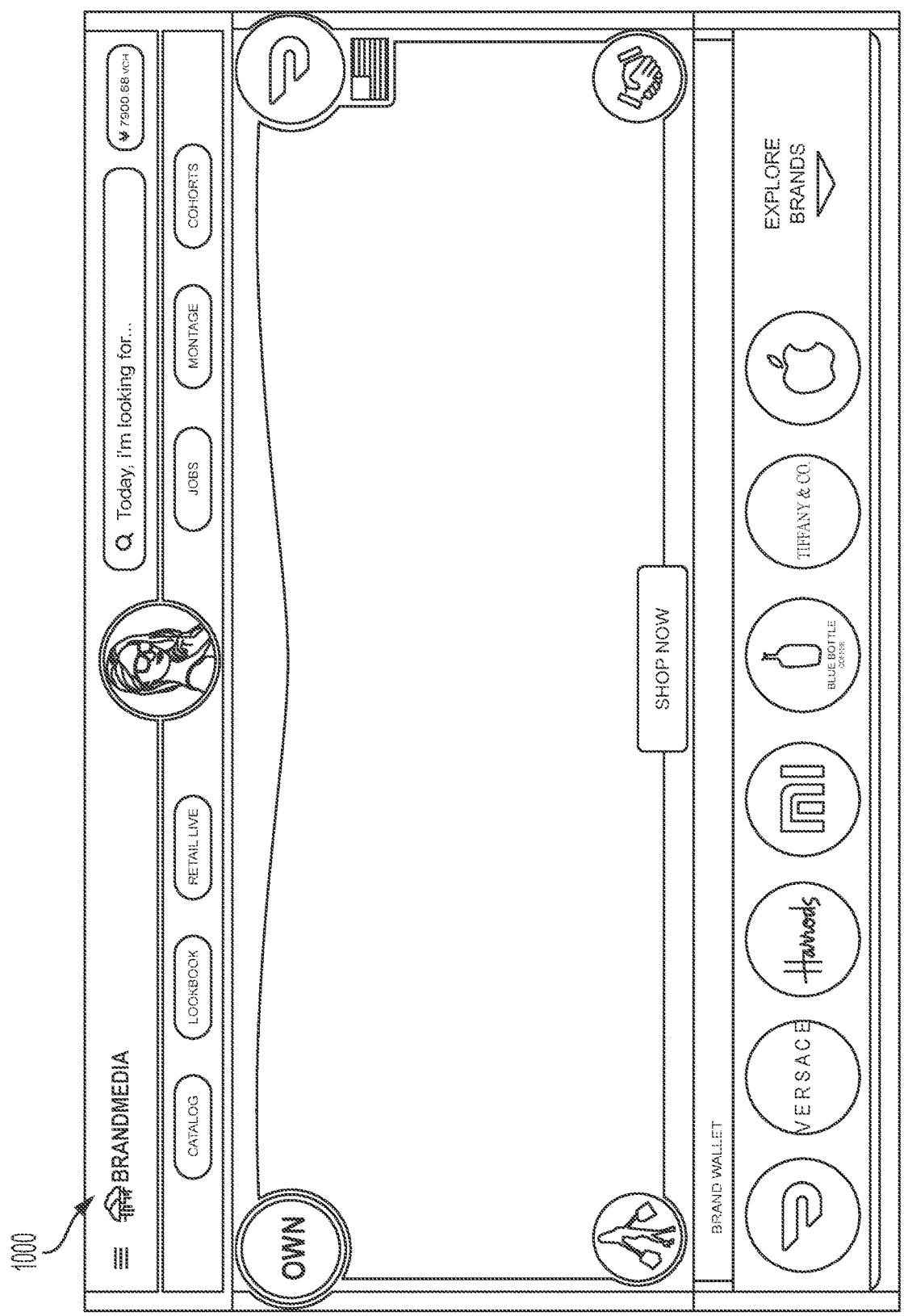

As depicted in FIG. 10A, the example BrandCube frame 1000 includes buttons around the perimeter including an "OWN" button, a brand coin, a country flag, a business button, a call to action button, and a user button. The OWN Button includes the action of owning a brand based on a smart ownership contract on the CloudChain Helix platform. Below that, as depicted in example frame 1000, is a brand wallet quick view. In some embodiments, the quick view presents the most recent owned brands in succession in a drawer. Also, in some embodiments, a user can explore for new brands with "Explore Brands". In some embodiments, a brand can enter information regarding an opportunity through a customer success platform.

In some embodiments, the BrandCube is the delivery mechanism of media and opportunities. In some embodiments, the BrandCube features a color coordinated frame, trigger flags, access to brand website, access to the brands mobile applications, brand story, Brand Message, brand values that can be accessed by interacting with the BrandCube. In some embodiments, the BrandCube includes color modules, graphics, colored borders and capabilities specific to the opportunity present within it. In some embodiments, the BrandCube presents a unique blend of customization and standardization for brands and delivers an expected result for the Brands followers.

In some embodiments, the BrandCube provides a data feed to each user. Such a data feed may include, for example, standardized offerings (e.g., opportunities) across user and business touchpoints determined according to a trained machine-learning algorithms that ascribes a personality matrix of data, and combine it with current trends and life events. In some embodiments, the opportunities provided via the feed are based on a user's personality matrix and provide new insights and offerings that each user can control.

In some embodiments, the call to action buttons on the cube are only seen in showcase cubes on owned brands. In some embodiments, when a user clicks one of these call to action buttons, they change a secondary state and initiate loading of an inner-cube engine. In some embodiments, the only call to action that an explore brands cube has are own (they have access to media controls though play, pause, replay, volume, etc). In some embodiments, an interrupt of the showcase immersion algorithm may alter the secondary state. In some embodiments, the secondary state is defined by the Inner-Cube Types: Commerce, Communication, System Actions, and External Actions.

In some embodiments, the Commerce type includes LookBook, Retail Live, Brand Catalog, affiliate marketing, product distribution. In some embodiments, when the secondary state is set to the Commerce type, an inner-cube state is set to commerce initiated and loads ecommerce steps navigation, and optionally, smart data questions for the respective brand. In some embodiments, commerce cubes support specific styles of payments and logistics. In some embodiments, brands set the available logistic types and payment types. In some embodiments, logistics includes delivery, local delivery, pick-up, and reserve. In some embodiments, each commerce type follows a numbered step process of what they are doing at any given time in-cube.

In some embodiments, the Communication type includes jobs, investment opportunities, EA, and corporate social responsibility (CSR). In some embodiments, when the secondary state is set to the Communication type, a mode of communication is set. In some embodiments, the mode of communication may be set to pitch (e.g., a video based communication protocol) or prompt (e.g., text based communication protocol). In some embodiments, navigational paths for a current user and brand combination are determined based on the set mode of communication.

In some embodiments, the system actions type includes search, wallet, ledger, settings, and user. In some embodiments, when the secondary state is set to a system actions type and resume the showcase immersion algorithm on close of the system action. As an example, as a user searches a wallet or for a new opportunity the showcase immersion algorithm is paused. As soon as the action is completed and if the user does not select a brand from the wallet, the showcase immersion algorithm resumes. In such an example, the showcase immersion algorithm would not resume when a Brand or opportunity interaction is taken as a result of the searching.

In some embodiments, the external actions types include sending opportunities and cubes to social media platforms or sharing them with other CloudChain users. In some embodiments, the external actions type includes viral, and external website integration. In some embodiments, the showcase immersion algorithm resumes once the respective action is complete.

In some embodiments, the UI and user experience (UX) design of the BrandCube is color coordinated based on the active opportunity or media in view. In some embodiments, high color contrast and clear paths to action present the user with a new intuitive way to shop, communicate or network with one another. In some embodiments, the actions and interactions that can happen on the BrandCube are standardized, not brand dependent, and operate the same for brand verticals. In some embodiments, opportunities are assigned a based color when presented to a user. In some embodiments, shines and sheens used off this based color to generate "covering" of a cube (e.g., to provide display variance).

In some embodiments, the BrandCube includes sections for Montage, Cohorts, LookBook, Brand Catalog, Retail Live, Jobs, and a user's brand wallet.

Montage

The montage UI provides channels that brands can use to extend their stories or for affiliate marketing, product distribution, user social responsibility, corporate events, executive access, investment capital, and so forth. In some embodiments, the montage UI provides a communication and engagement channel for users and brands. In some embodiments, a brand can populate, via a Brand Node, the montage UI with, for example, affiliate sale items, corporate events, investment opportunities, product distribution opportunities, or executive access. In some embodiments, the montage UI allows users to follow brands and to gain an insight into how each brand operates. For example, a brand may gain a grass-roots style following with a much-needed productivity push that helps the organization meet their goals while giving the user some skin in the game.

Cohorts

The cohorts UI provide a peer-to-peer action network facilitated by, for example, real-time video chat. A brand or user can log on to the cohorts UI as a way to fulfill a need in, for example, employment, expertise, or mentorship on a certain topic. Users can, for example, offer their skillsets to business cohorts for searchability and can be asked to join a cohort around a specialization. For example, a cohort can be created to find top tier talent for a particular skill set. In some embodiments, a limit to the number of people that can get into the group and users and brands are added to each cohort. In some embodiments, cohorts have an uninterrupted face-to-face style group meeting.

LookBook

In some embodiments, the LookBook service provides a fear of missing out (FOMO) opportunity that may be employed to, for example, execute product launches. For example, a brand may take pre-sales and obtain a barometer reading on the latest products. In some embodiments, users wait for notifications or opportunity feed media that shows the new products from brands that they OWN (e.g., with whom they have a smart ownership contract).

In some embodiments, the LookBook provides a way for users to download digital catalogs and request physical LookBook catalogs from brands. The LookBook aims to provide a way for Brands to show off product to the users that love them. In some embodiments, through the LookBook users have access to the upcoming products that a Brand will put out in the coming cycle before anyone else. As such, loyal customers can take advantage of limited launches, presales, and product launches directly through the LookBook.

Brand Catalog

In some embodiments, Brand Catalog UI provides a brand specific catalog with exclusive and scarcity driven commerce with limited quantities and incentives for brand owners. In some embodiments, through the Brand Catalog UI, brands have the option of what and how much to provide (e.g., merchandise) to various users. In some embodiments, the Brand Catalog UI allows brands to select the tier(s) of users that access, for example, a discounted. In some embodiments, Brand Catalog UI provides a product catalog that is standardized across all brands to provide a familiar experience as well as a streamlined checkout process.

In some embodiments, AI including machine learning, and scarcity-based electronic (E)-commerce, fuels E-commerce sales on the described interoperable cloud-based system. Products may be limited in quantity and based on the preferences of a currently logged in user account. In some embodiments, brands can provide variable shopping rewards and other incentives via the Brand Catalog UI. In some embodiments, the Brand Catalog UI provides rotating catalogs, new offerings, and the variable rewards to users to incentives returning to the product catalog for a given product or Brand. In some embodiments, a product catalog serves as a performant pass-through to the Brand's existing E-commerce operation. The pass-through can be referred to as background sync that allows a brand to enter payment gateway preferences into a respective brand dashboard.

Retail Live

In some embodiments, services provided through the RetailLive UI (RetailLive) enhance brick and mortar visits by using, for example, a Geo-location API and in-store locations to extend incentives in real-time based on location and limited timing. In some embodiments, Retail Live allows brands to showcase opportunities (e.g., via the showcase view) that get users in-store or on premise. In some embodiments, Retail Live allows brands to, for example, verify that a user is in their brick and mortar establishment and push live updates and discounts to the users verified to be in-store.

In some embodiments, proximity algorithms and real-time geo-location data are employed in tandem to prove the location of a user in order to provide, for example, coupons and discounts in real-time.

Jobs

In some embodiments, services provided through Jobs UI includes a job discovery and application service that allows applicants to use shortened video pitches to apply to open positions with limited opening ratios. In some embodiments, these services also include, for example, following up on jobs as well as providing a digital CV, electronic-graph, and/or video pitch for a job. In some embodiments, the Jobs UI includes a dashboard page that includes an employment module attached to each user profile that allows a user to store employment information to their identity. In some embodiments, a user can control and provide job information with brands in order to take advantage of open positions. In some embodiments, a digital CV can be edited and sent to a brand with a posted open opportunity.

In some embodiments, video storage and recording is provided by the Jobs UI and can be employed to associated users' investment pitches, job interview pitches, and other video content, with other opportunity types. In some embodiments, video clips have a standardized limit of time and are specifically used for applying to jobs, requesting capital, and pitching new business ideas. In some embodiments, the Jobs UI can be employed to manage users in a given cohort, attend cohort meetings, share webinars, and view cloud video content recordings. In some embodiments, this media can be accessed after the meetings have adjourned. In some embodiments, a pitch includes a short, limited time video application that is exchanged securely with a brand in turn for jobs, investment capital, and other brand opportunities. In some embodiments, a pitch delivers video in a peer-to-peer way to brands.

Brand Wallet™

In some embodiments, ownership of each user's owned brands is provided displayed through their brand wallet is provided in return for exclusive access to products, brand employees, jobs and more incentives. In some embodiments, the brand wallet allows users to move through payment methods, identification documents, and so forth. In some embodiments, the brand wallet gives control over who has access to what pieces of data—with the user as the power holder in this process. In some embodiments, the brand wallet is secured and controlled by the user and can be accessed through facial authorization, seed keys, and/or IDKey. In some embodiments, the user maintains control over brand accessibility to personal details using the Brand Wallet.

In some embodiments, a user can sift through their choice owned brands data and gains direct access to opportunities through the BrandCube. As an example, a user indicates that he or she is getting married soon. The user owns "Al-Clad Cookware" as an owned brand. Al-Clad can categorize different opportunities based on a market segments or keywords and if marriage is one of the life events is being marketing, then the user who have a life event of marriage listed are likely to see these opportunities.

In some embodiments, the brand wallet provides users an area to discover what they have recently purchased from Brands as well as what pre-orders or sales that they are awaiting. In some embodiments, the e-commerce wallet functionality is located on a separate tab within the brand wallet and can also be accessed from the navigation bar. A user can use the wallet to see what pre-orders they have currently on the way and their status. In some embodiments, the Brand can update the user on the statuses of a given order. In some embodiments, a wish-list style cart functionality allows users to save opportunities to their brand wallet with customized notifications on when they expire.

In some embodiments, the brand wallet allows authenticated users to peer into the past and present smart ownership contracts that exist on the blockchain. In some embodiments, the block explorer allows searchability of the opportunities of which a user has taken advantage. The searching through of past opportunities provides for the formations of new opportunities and repeat purchases.

In some embodiments, a blockchain style user identity management verifies users' identity. In some embodiments, a verified identity can communicate with the databases or data stores associated with them in the cloud. In some embodiments, user will have full control over their respective identity and can provide proof of sharing to a brand of their choice in return for access to the CloudChain Global Marketplace.

Color Theory

Figure 9:
FIG. 9 depicts non-limiting color theory examples.

FIG. 9 depicts color theory examples 900 that can be employed within the described interoperable cloud-based system. In some embodiments, the BrandCube augments and changes color based on the opportunities and interactions that take place. In some embodiments, the BrandCube acts like an organic force that changes in style and coordination based on a number of factors, such as trigger flag, opportunity type, time remaining, limited quantities and so forth, that have an effect on urgency and coordinate with the cube to relay that message. In some embodiments, opportunities are color coded to give a visual indicator of exactly what type of opportunity you are interacting with. Some examples include: Black Friday trigger flags that emit holiday-based color themes with buttons and call to actions that are standardized and are consistent with color theory meanings.

Virality Button—Social Platform Sharing

In some embodiments, users can share the opportunities provided through their respective data feed to social media, such as Twitter™, Facebook™, LinkedIn™ or Instagram™, by clicking a specific icon and sending a link from Cloud-Chain to that social media that provides a path to onboard more users for that brand. In some embodiments, clout is provided to a referring user and user who build brands achieve variable reward opportunities. In some embodiments, brands are provided insight into who are their most loyal users. This functionality is referred to as the Viral "V" button. This button connects to users' social profile and can act as a pass-through for the opportunity the users are sharing. In some embodiments, the functionality and extensibility of this feature can be limited by the brands as follows. For example, an exclusive type can be set by a respective brand to not be shared via the viral button, a viral type can be shared by anyone and viewed by anyone, and an owned type can be shared by the user and only accessed after they agree to the smart ownership contract presented.

Gamification—Network Effect

In some embodiments, top tier loyal brand followers receive an edge over other owners (users). Network effect can come in the form of added badges or profile notification that the user are an early adopter/ambassador for the brand by, for example, having users sign on and follow or OWN a brand. This functionality could be used to provide clout to the initial user or to create a top tier of owners (loyalists).

In some embodiments, an initial mining style reward can be extended (similar to a crypto currency) for the first owners to recruit their friends to join the platform and extend crypto currency as a way to take advantage of the offerings on the platform. In some embodiments, these rewards can be in the form of blanket discount coupons that are linked to the user who supplies them to their friends and family.

In some embodiments, tracking a user's progress towards a given goal can be employed to keep the user engaged and working toward an end result. For example, as a user fills out their profile they are provided a progress to completion that shows how complete the profile is. In some embodiments, transactional email can be used to remind users of their goals.

Trigger Flags

In some embodiments, brands can label opportunities with trigger flags to call attention finite opportunities. Trigger flags can also stand for metric specific details such as: market leader, trending brand, and product launch. In some embodiments, trigger flags sync with the color theory behind the opportunity itself and are built directly into the UI of the BrandCube.

In some embodiments, trigger flags include targeted labels affixed to the BrandCube to mark the content in the viewable section by a specific event or meaning. Examples include Black Friday Deal, Christmas Sale, Mother's Day Deal, Market Leader, Product Launch, and so forth. In some embodiments, the trigger flag employ color theory as a means of subliminal connection to the given brand opportunities. Color can be used in such a way that conveys excitement and freshness as well as taxonomy for the opportunities that are provided from brands. In some embodiments, a trigger flag is includes in the header of pages of BrandCube.

In some embodiments, dynamic scheduling algorithms place trigger flags in a priority queue with, for example, a round-robin algorithm for assigning the schedule of a given trigger flag. In some embodiments, trigger flag holidays are a factor due to the detailed label that gives an offering inside the cube a better chance of being interacted with. In some embodiments, trigger flags algorithms accept priority events such as, for example, holidays, retail cycles, life events and deadlines, and so forth.

In some embodiments, the described interoperable cloud-based system employs a dynamic scheduling algorithm, such as a shortest path algorithm, for scheduling based on, for example, loyal follower product launch.

Additional Brand Cube Attributes

In some embodiments, each brand has a corresponding country flag beneath their brand coin logo on the Brand-Cube. In some embodiments, this flag notifies the current company headquarters or origin for open visibility to the users on the platform. In some embodiments, brands based in different areas of the world make for an interesting search as well as the ability to locate brands from your heritage.

In some embodiments, each brand has the ability to share a mission, story or values with their followers and potential followers.

In some embodiments, the BrandCube is split into two bottom fixed buttons to the right and left. In some embodiments, the right most button is the business button that allows users to explore business opportunities that the featured brand has available once that brand is owned by the user. Example business offerings include: Jobs, Montage, and Cohorts.

In some embodiments, the leftmost button depicted in the BrandCube is a user button. In some embodiments, this button directs a user to view all of the user based offerings that a brand might have. In some embodiments, the user offerings are made up of LookBook, Product Catalog and Retail Live.

BrandCube Viewport Example Pages

FIGS. 10A-10J depict various example pages provide in the CloudChain Global Marketplace.

FIG. 10A depicts an example framework page 1000 for the CloudChain Global Marketplace. The example framework page 1000 can be employ to provided, for example, a perennial feed of brand-based opportunities (e.g., with the BrandCube).

Figure 10B:
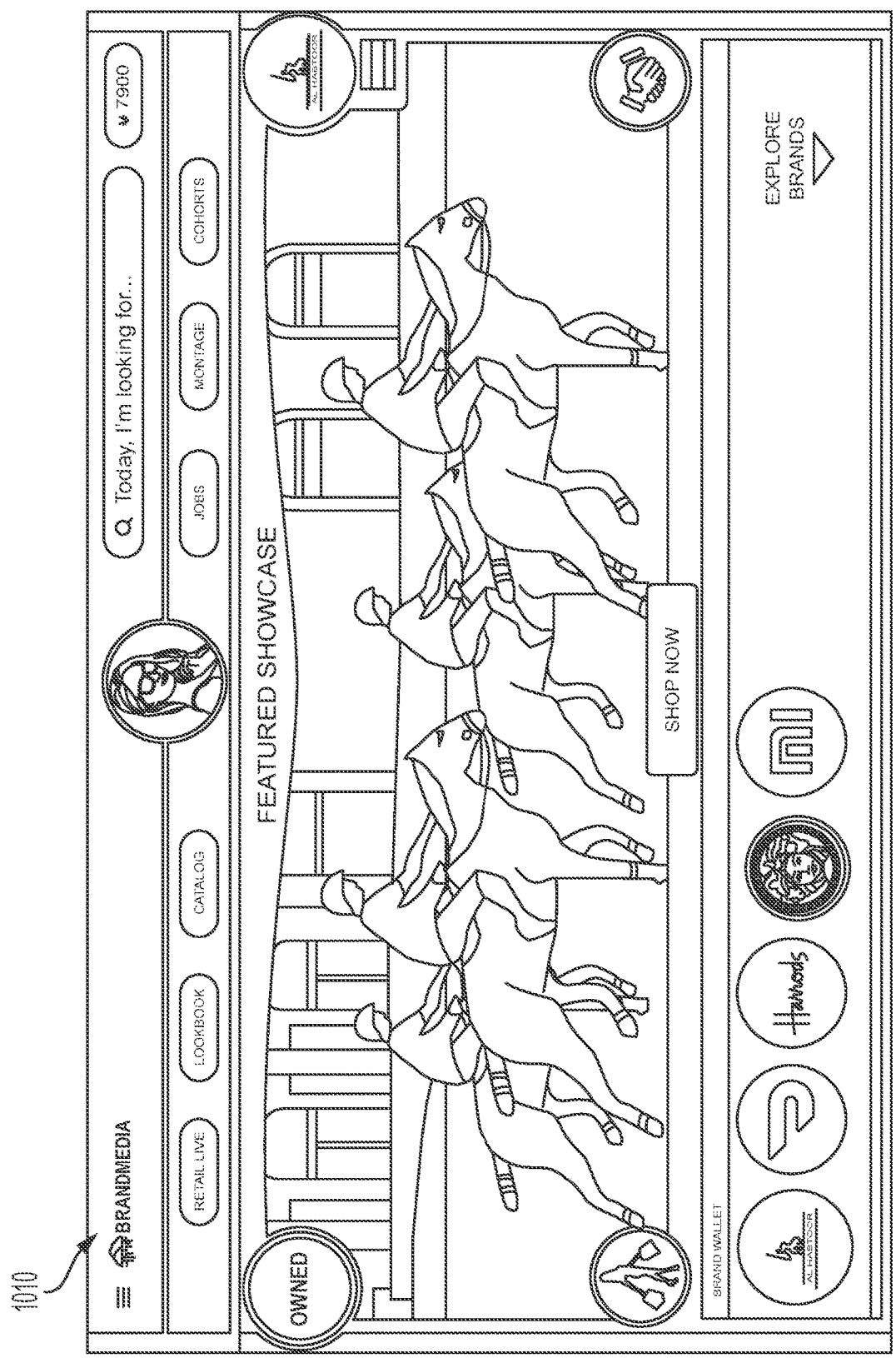

FIG. 10B depicts an example page 1010 on the Brand-Cube with a featured showcase view with the brand wallet in view.

Figure 10C:
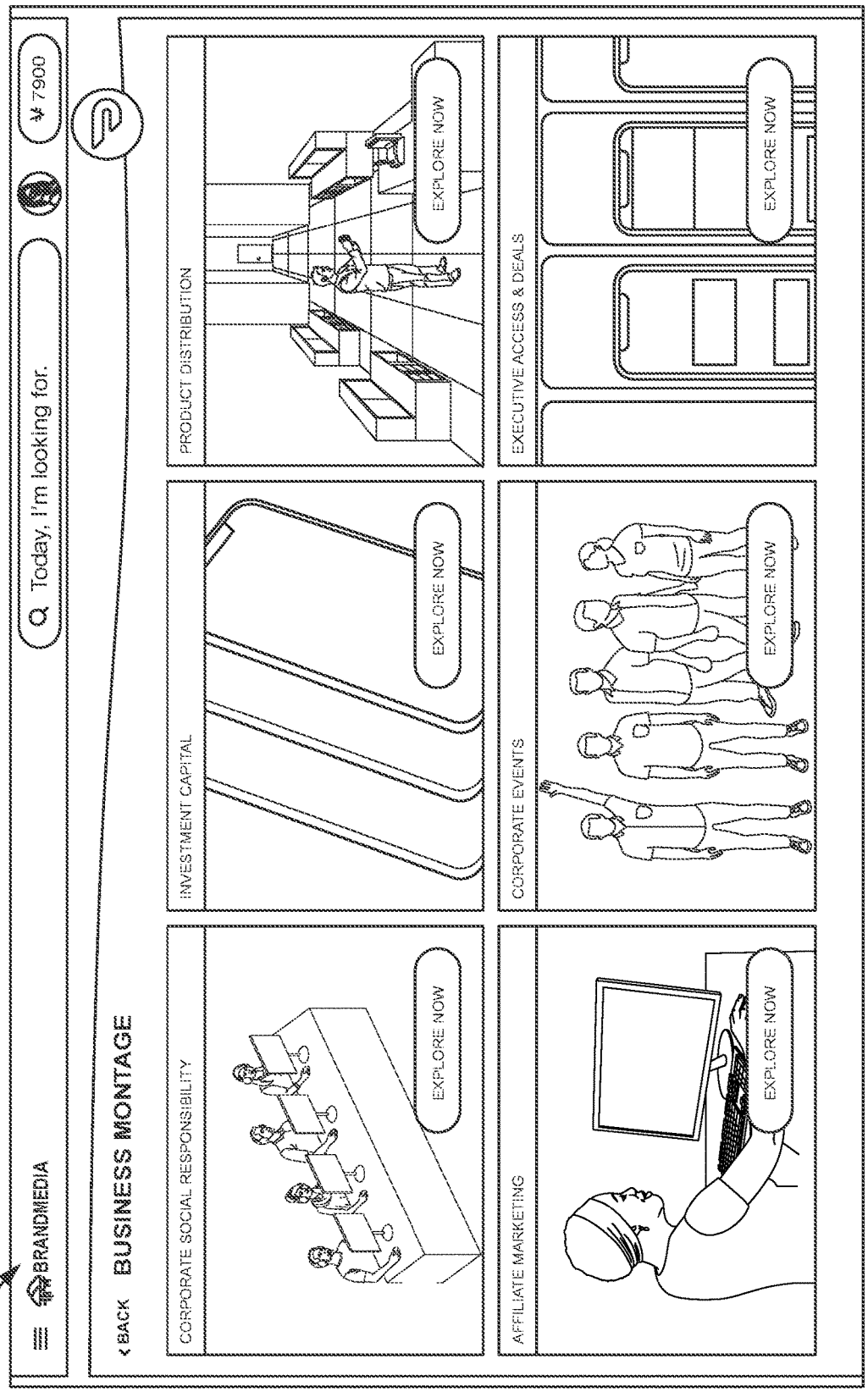

FIG. 10C depicts an example montage page 1020 that provides, for example, a matrix of opportunities. Such a matrix may include, for example, investment capital, corporate events, corporate social responsibility, affiliate marketing, product distribution, and executive access.

FIG. 10D depicts an example cohorts page 1030 that includes a peer-to-peer action network. Such a peer-to-peer action network may facilitate, for example, team building, company building, and talent pursuits. In some embodiments, the cohorts page 1030 may incorporate video chat technology to provide a rich user experience around user brand connections.

Figure 10E:
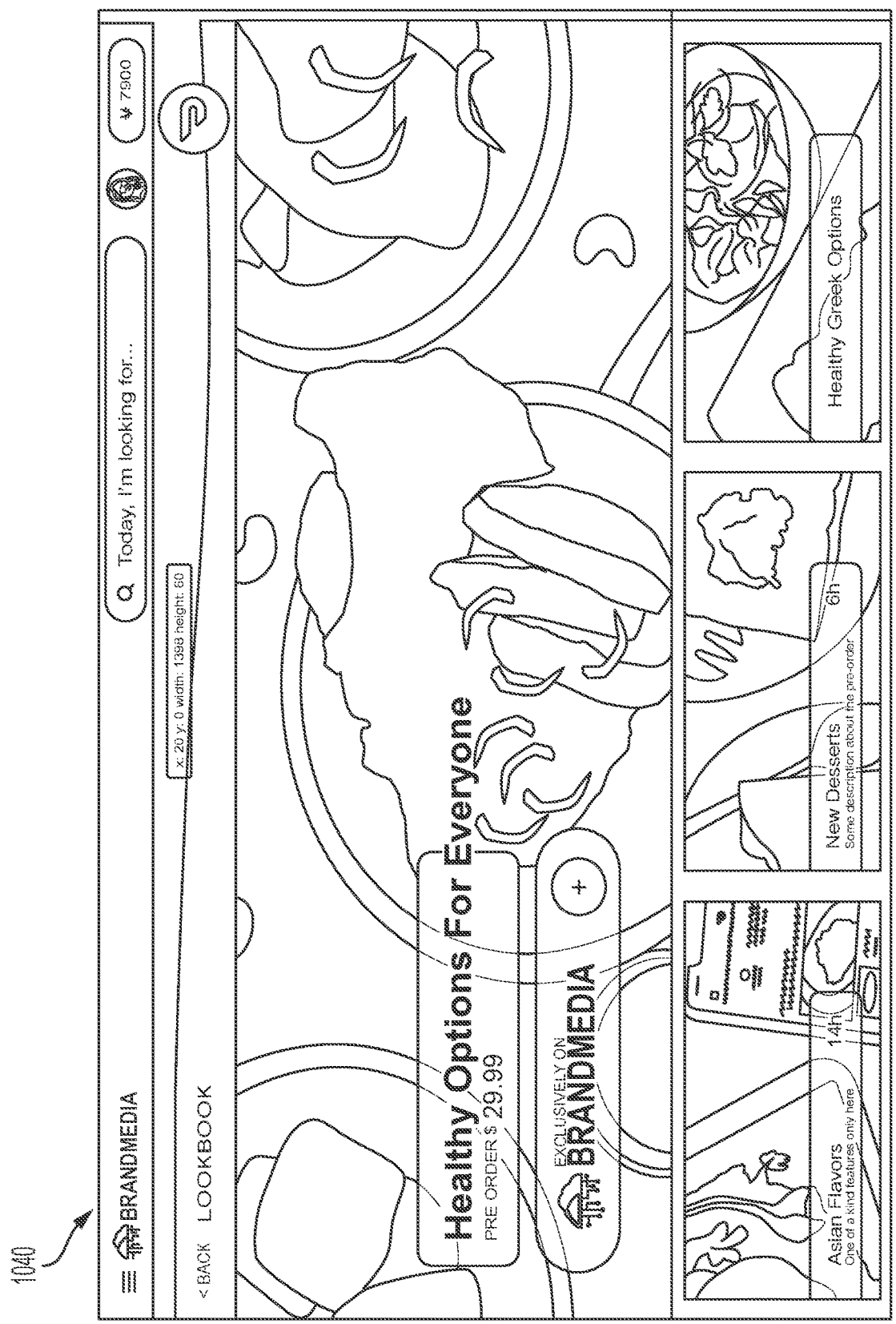

FIG. 10E depicts an example of the an example Look-Book page 1040 that can provide, for example, extend upcoming and not yet ready products to their loyal owners in a standardized way.

Figure 10F:
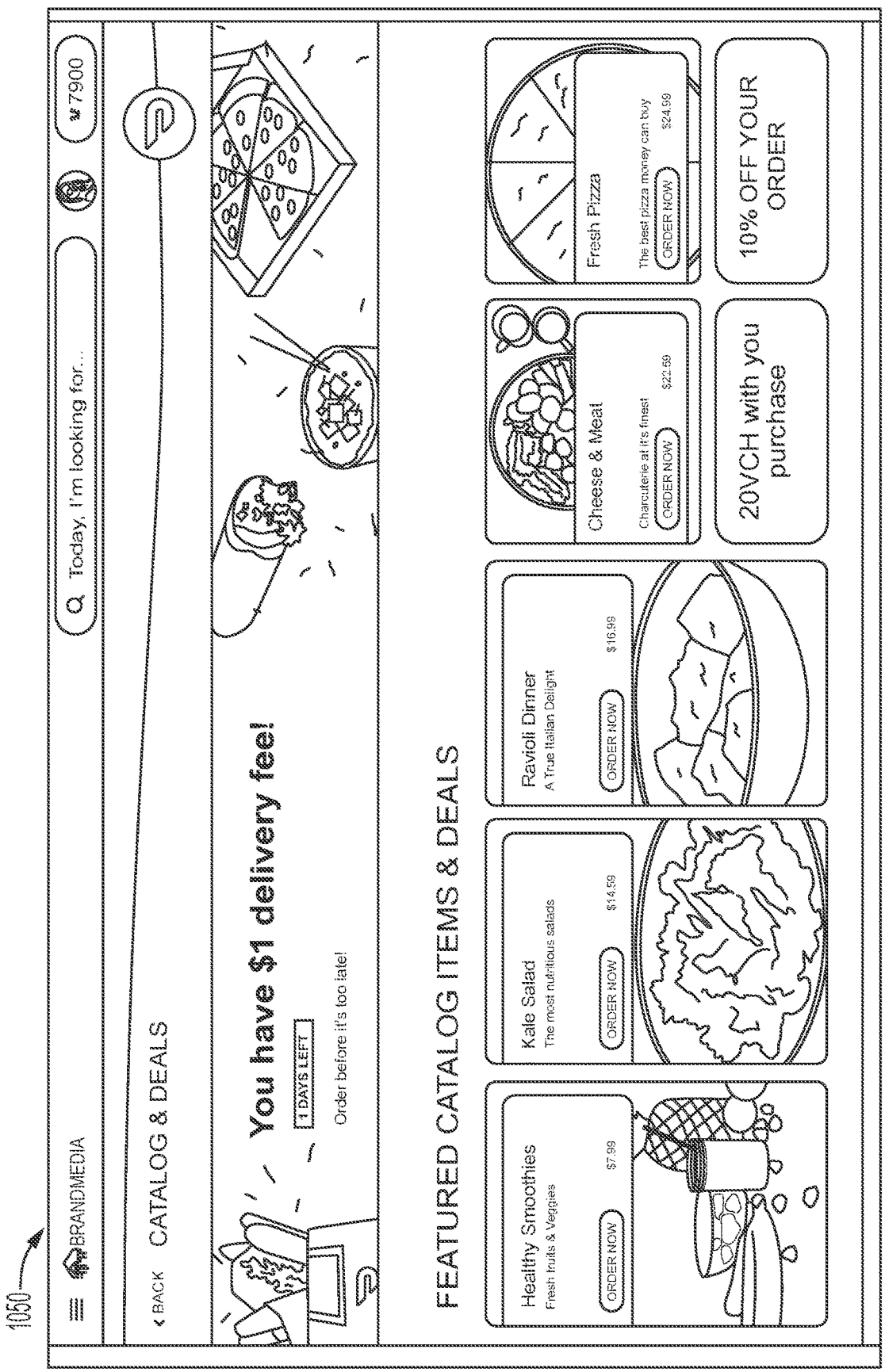

FIG. 10F depicts an example of the an example Brand Catalog page 1050 that can provide, for example, a traditional commerce-based opportunity that provides offerings directly to users.

Figure 10G:
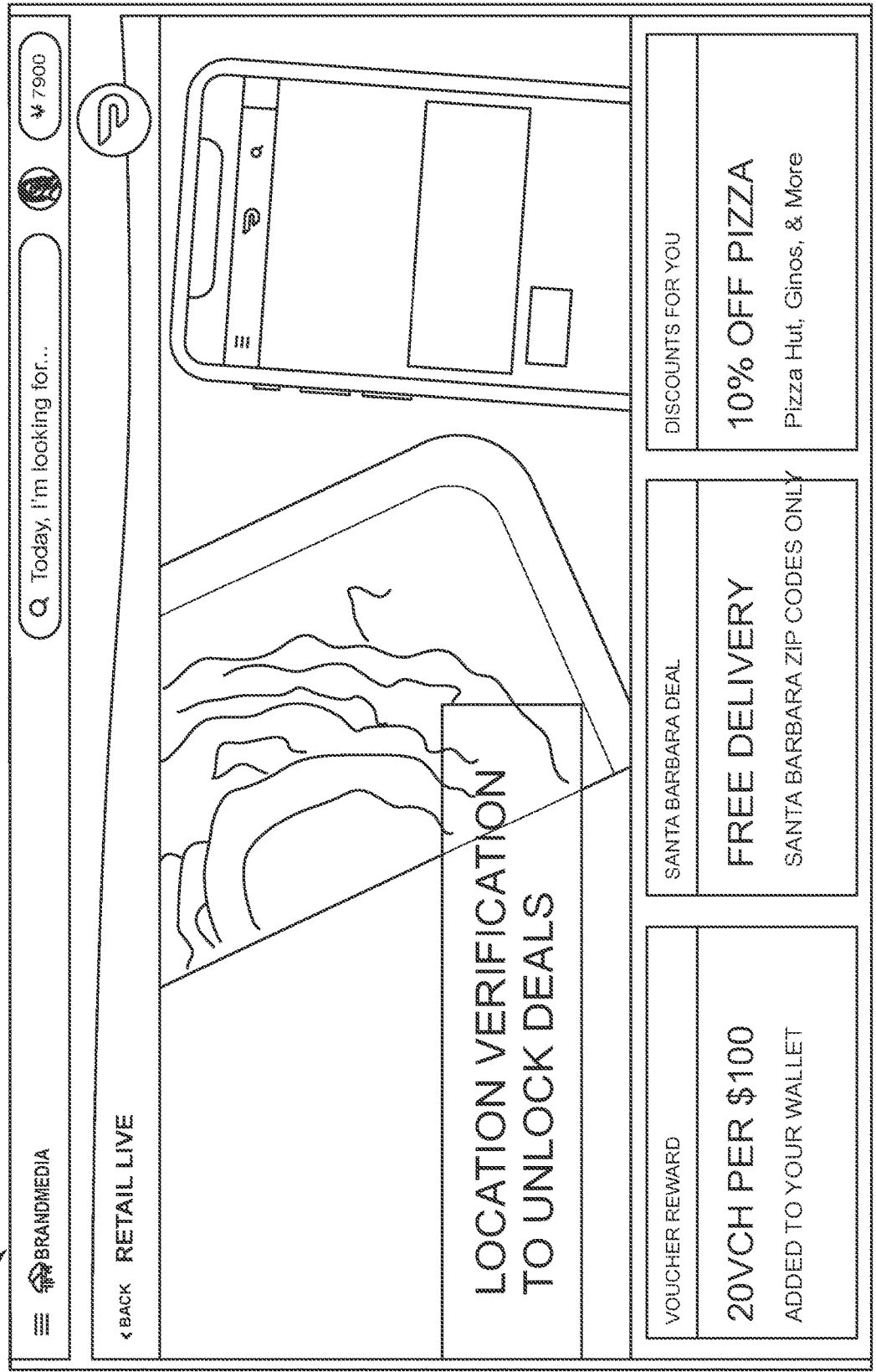

FIG. 10G depicts an example of the an example Retail Live page 1060 that can provide, for example, incentives in real-time based on location and limited timing.

Figure 10H:
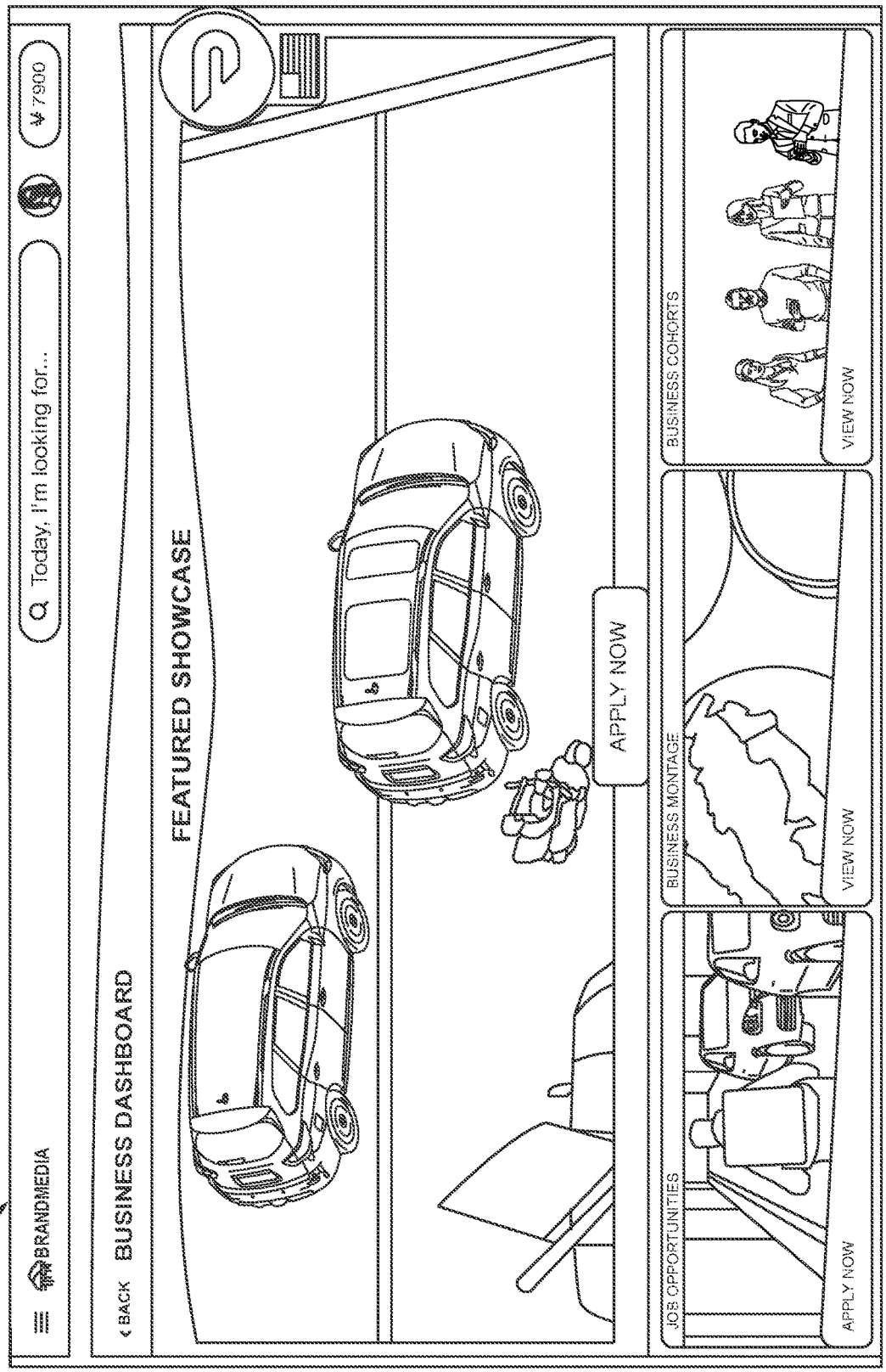

FIG. 10H depicts an example dashboard page 1070 that provides for limited video and file transfer-based employment applications.

Figure 10I:
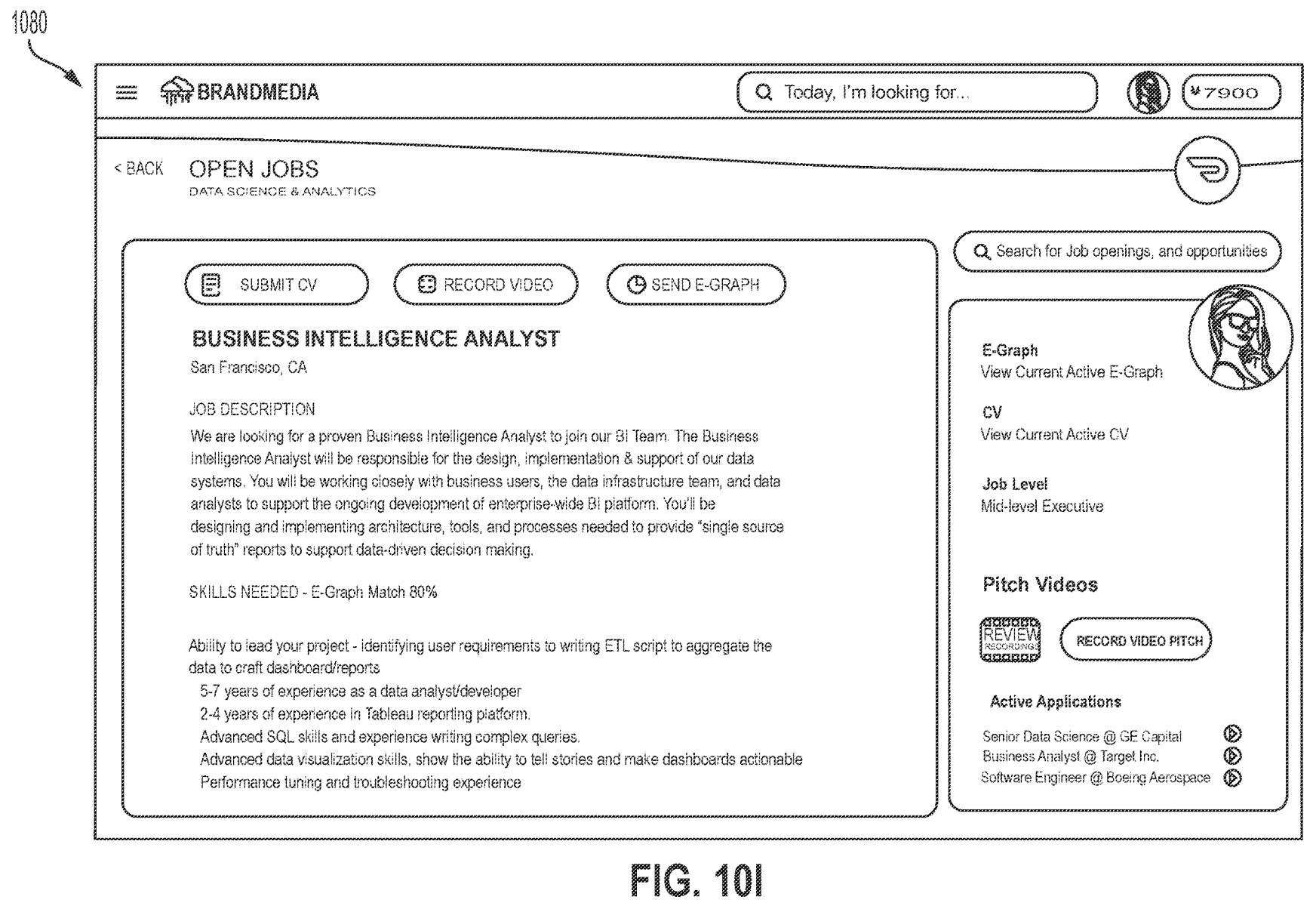

FIG. 10I depicts an example Open Jobs and Jobs Opportunities UI 1080 provided by the described interoperable cloud-based system.

Figure 10J:
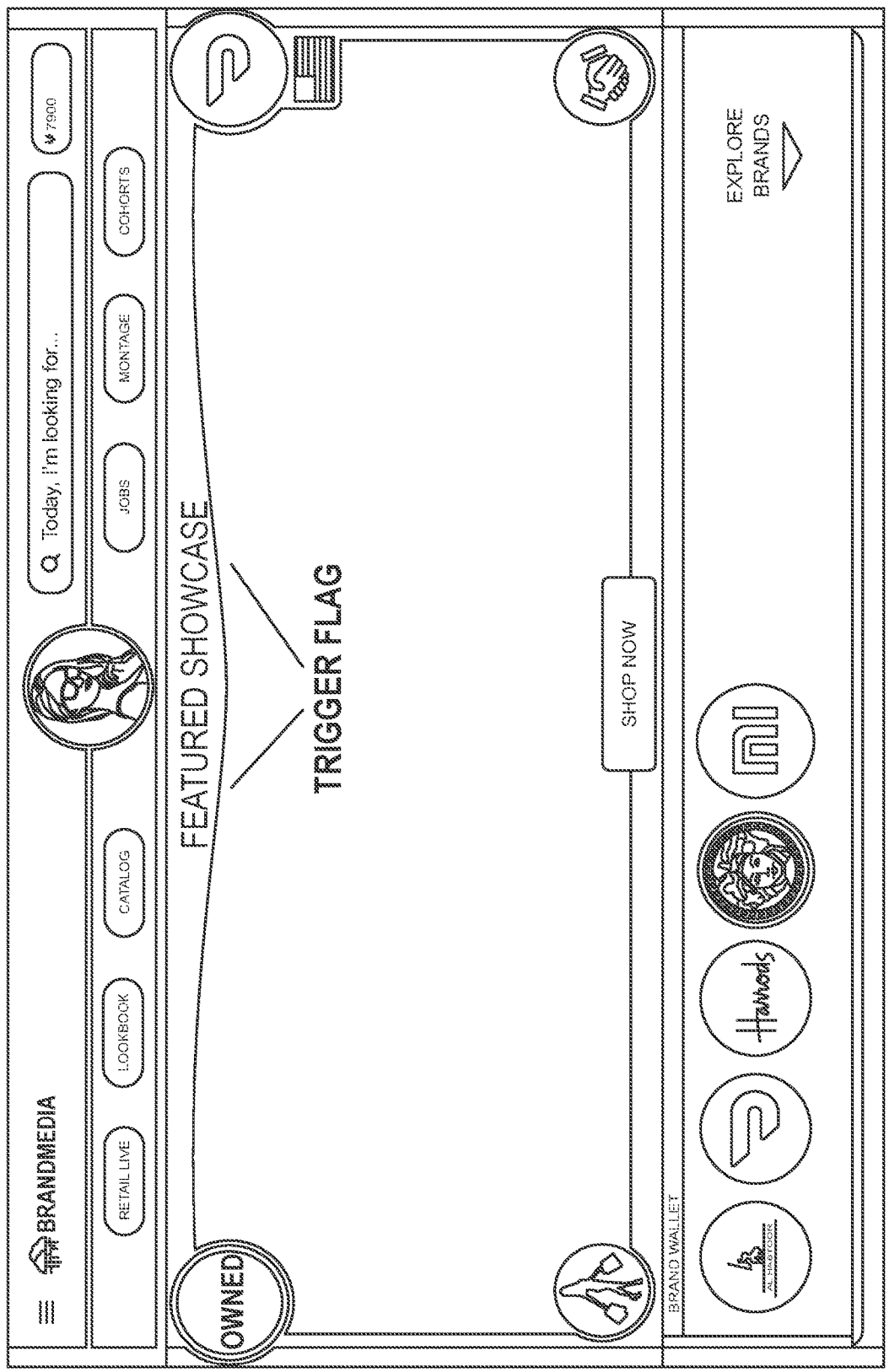

FIG. 10J an example of the an example Trigger Flag page 1090 that can provide, for example, specific labels (trigger flags) that signify the type of opportunity that are being viewed within the BrandCube. In some embodiments, trigger flags correspond to, for example, retail cycles, holiday calendars and other special dates or days dictated by other businesses, cultures and societies. Some examples of trigger flag types include Christmas Deals, Black Friday, Singles Day, Cyber Monday, Thanksgiving Day Sale, Memorial Day Sale, Boxing Day, Mother's Day, Father's Day, and so forth.

Example Processes

FIGS. 11A, 11B, 11C, and 11D each depict a flowchart of an example process, 1100, 1120, 1130, and 1140 respectively, that can be implemented by embodiments of the present disclosure. The example processes 1100, 1120, 1130, and 1140 can be implemented by the components of the described interoperable cloud-based system, such as described above in FIGS. 1A and 1B. The example processes 1100, 1120, 1130, and 1140 show in more detail how a user device interacts with the described systems. The flowcharts generally show how a user device receives opportunities through a data feed based on a provided data grouping satisfying at least one criterion for ownership of a brand. In some embodiments, the processes 1100, 1120, 1130, and 1140 provide for a secure exchange of personal data with brand data.

For clarity of presentation, the description that follows generally describes the example processes 1100, 1120, 1130, and 1140 in the context of FIGS. 1-10I, and 12A-13C. However, it will be understood that the processes 1100, 1120, 1130, and 1140 may be performed, for example, by any other suitable system, environment, software, and hardware, or a combination of systems, environments, software, and hardware as appropriate. In some embodiments, various operations of the processes 1100, 1120, 1130, and 1140 can be run in parallel, in combination, in loops, or in any order.

Figure 11A:
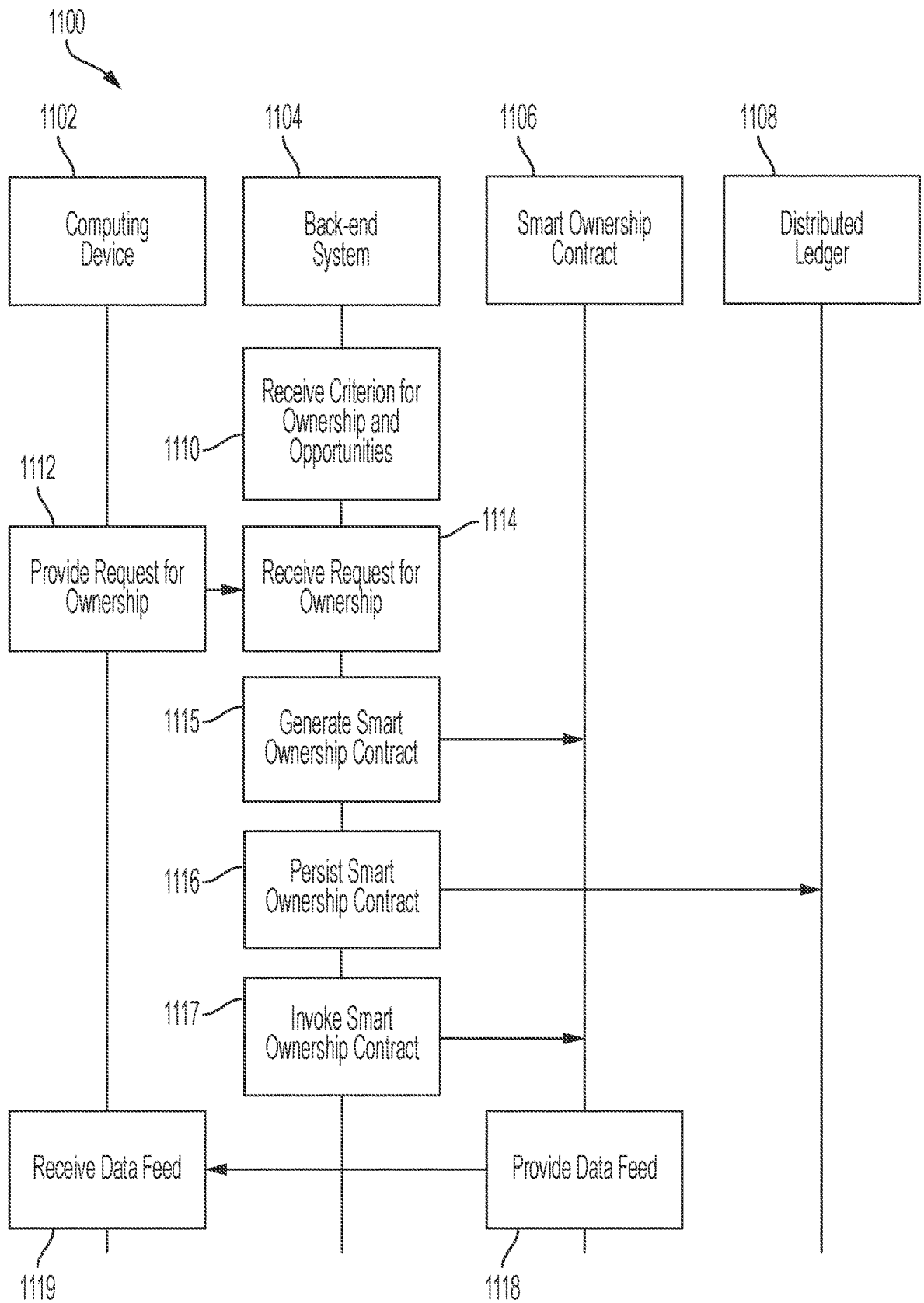
FIGS. 11A-11D depict flowcharts of a non-limiting examples process that can be implementation by embodiments of the present disclosure.

For process 1100 as depicted in FIG. 11A, at 1110 a back-end system 1104 receives a criterion for ownership and a plurality of opportunities from a Brand Node associated with a brand. In some embodiments, the request comprises consent from the user for the Brand Node to access the data grouping. In some embodiments, the criterion for ownership comprises a request for at least one specific type of personal data or metric, and the data grouping comprising the at least one specific type of personal data or metric for the user. In some embodiments, the opportunities comprise brand data. In some embodiments, the brand data is self-contained under the Brand Node. In some embodiments, the brand data comprises media associated with the Brand Node. In some embodiments, the brand data comprises investment capital, corporate events, corporate social responsibility, affiliate marketing, product distribution, executive access, product launches, product catalogs, data regarding a headquarters of the brand, data regarding executives of the, and a stock ticker for the brand. In some embodiments, the opportunities are subscription based. In some embodiments, the opportunities comprise interactions, incentives, and rewards with the brand. In some embodiments, the Brand Node is generated for an on-boarded brand entity, and the on-boarded brand entity populates content, accesses data, and tap networks through a Brand Node Interface. In some embodiments, the on-boarded brand entity comprises the brand. From 1110, the process 1100 proceeds to 1112.

At 1112, a personal computing device 1102 provides a request for ownership of a brand to the back-end system 1104. In some embodiments, the request comprises user credentials and a data grouping. In some embodiments, the data grouping is determined based the criterion for ownership. In some embodiments, the user credentials comprise a UPI and a private key associated with a corresponding public address. In some embodiments, the personal computing device 1102 receives personal data from a user interface, and generates a Master Data Group comprising the personal data. In some embodiments, the personal computing device 1102 generates the user credentials and a recovery seed, through an identity chain service provided by the back-end system, and persists the Master Data Group. In some embodiments, the Master Data Group is associated with the generated user credentials and the recovery seed. In some embodiments, the Master Data Group comprises the data grouping. In some embodiments, the request for ownership of the brand includes a digital signature. From 1112, the process 1100 proceeds to 1114.

At 1114, the back-end system 1104 receives the request for ownership of the brand from the personal computing device 1102. From 1114, the process 1100 proceeds to 1115.

At 1115, the back-end system 1104 generates a smart ownership contract 1106 associated with the user credentials and the brand. In some embodiments, the smart ownership contract is updated based on a multi-signature model that requires receiving approval from both the Brand Node and the personal computing device before a change is implemented. In some embodiments, the back-end system 1104 receives a proposal to change contents of data mapping from the Brand Node, provides the proposal to the personal computing device 1102, and updates the smart ownership contract 1106 with the changed contents of the data mapping based on an approval received from the personal computing device 1102. In some embodiments, the generation of the smart ownership contract does not reveal an identity of a user associated with the user credentials. In some embodiments, the smart ownership contract allows a free-flow of information between the personal computing device and the Brand Node as a peer-to-peer communication flow. From 1115, the process 1100 proceeds to 1116.

At 1116, the back-end system 1104 persist the smart ownership contract 1106 to a distributed ledger 1108. In some embodiments, the back-end system 1104 encrypts the data grouping, and persists the encrypted data grouping to a second distributed ledger. In some embodiments, the second distributed ledger comprises an identity blockchain. In some embodiments, the encrypted data grouping is persisted within a block. In some embodiments, the public address is a pointer in the chain to the encrypted data grouping. In some embodiments, the distributed ledger 1108 comprises an opportunities blockchain. In some embodiments, the opportunities blockchain comprises a permissioned private blockchain. From 1116, the process 1100 proceeds to 1117.

At 1117, the back-end system 1104 invokes the smart ownership contract 1106 to provide the data feed to the personal computing device 1102 when prompted by the Brand Node. From 1117, the process 1100 proceeds to 1118.

At 1118, smart ownership contract 1106 provides the data feed to the personal computing device based on the provided data grouping satisfying the criterion for ownership. In some embodiments, the data feed comprises the opportunities. In some embodiments, the smart ownership contract 1106 provides the Brand Node associated with the brand access to the data grouping. In some embodiments, the personal computing device 1102 provides user preferences for a user associated with the user credentials to the back-end system 1104. In some embodiments, the smart ownership contract 1106 processes the user preferences through a machine-learning model to determine the opportunities, the machine-learning model having been trained with received user preference for a respective plurality of users who have claimed ownership of the brand. In some embodiments, the machine-learning model comprises a weight of match algorithm. From 1118, the process 1100 proceeds to 1119.

At 1119, the personal computing device 1102 receives the data feed from the back-end system 1102. In some embodiments, the personal computing device 1102 provides a view of the brands owned by the user credentials. In some embodiments, the ownership of a brand is determined based on a respective smart ownership contract between the user credentials and each of the respective brands owned by the user credentials. In some embodiments, facial recognition or biometrics are used to secure the personal computing device 1102 and provide profile verification. In some embodiments, the personal computing device 1102 accesses, through a block explorer provided by the back-end system 1104, a transaction history associated with the user credentials and stored to the distributed ledger. In some embodiments, the personal computing device 1102 provides real-time geo-location data, to the back-end system 1104 through a geo-location API. In some embodiments, the back-end system 1104 performs a verification check on a location of the personal computing device based on the received real-time geo-location data. In some embodiments, the opportunities comprise real-time incentives based on a verified location of the personal computing device. In some embodiments, the data feed comprises content provided by a plurality of brands. In some embodiments, the data feed comprises a user stream and a business opportunities stream. In some embodiments, the user stream and the business opportunities stream are employed to provide display variance of the content provided to the personal computing device based on a plurality of smart ownership contracts associated with the user credentials and the brands determined to be potential matches for ownership. In some embodiments, the data feed is provided through an encrypted communication channel. In some embodiments, the data feed is consumed according to a Brand Data policy provided by a standardization agreement. In some embodiments, a collaborative filtering algorithm recommends brands and products based on similar activities of other users. In some embodiments, the recommended brands and products are provided to the personal computing device 1102 through the data feed and filtered based on a showcase immersion algorithm. In some embodiments, the collaborative filtering algorithm recommends brands and products based on Global/Local locations, brand preferences, similar interactions, and product interest. In some embodiments, the data feed comprises a flow of offerings at any given time selected based on a personality matrix of data for a user associated with the user credentials, selected preferences, current trends, life events, and display variance. In some embodiments, the opportunities comprise an ability to purchase items from the brand. In some embodiments, the personal computing device 1102 provides content received from provided the data feed through a user interface. In some embodiments, the user interface comprises a display screen. In some embodiments, the content of the data feed is provided to the display screen via a Brand-Cube graphical user-interface received from the back-end system 1104. In some embodiments, the providing of the content of the data feed is compatible with advertisement blockers. From 1119, the process 1100 ends.

Figure 11B:
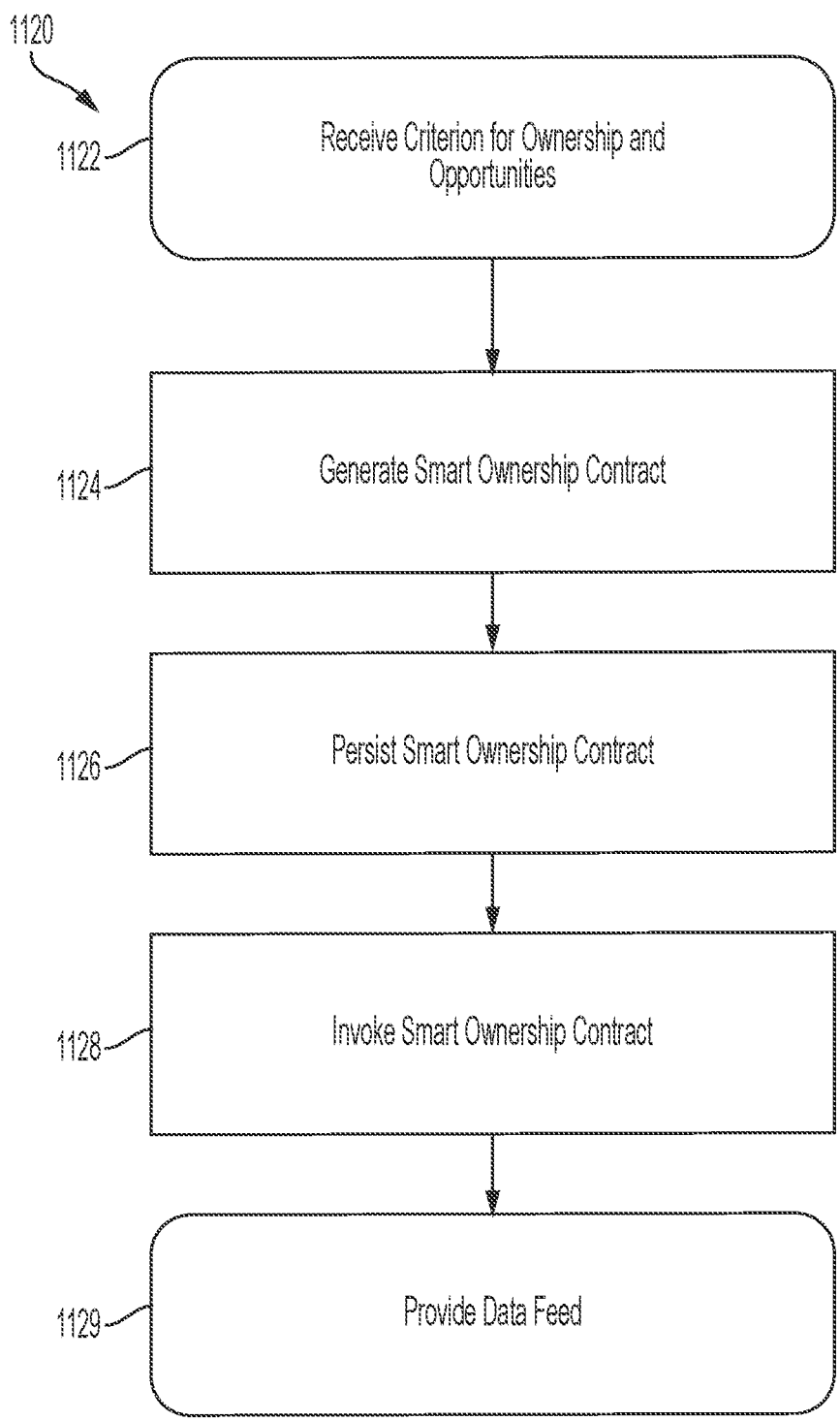

For process 1120 as depicted in FIG. 11B, at 1122 a criterion for ownership and a plurality of opportunities is received from a Brand Node associated with a brand. In some embodiments, the opportunities comprise the brand data. From 1122, the process 1120 proceeds to 1124.

At 1124, a smart ownership contract associated with the user credentials and the brand is generated. From 1124, the process 1120 proceeds to 1126.

At 1126, the smart ownership contract is persisted to a distributed ledger. From 1126, the process 1120 proceeds to 1128.

At 1128, the smart ownership contract is invoked, when prompted by the Brand Node, to provide the opportunities to the computing device. From 1128, the process 1120 proceeds to 1129.

At 1129, a data feed is provided to the computing device by processing a set of instructions that are included in the smart ownership contract. In some embodiments, the data feed is provided based on the provided data grouping satisfying the criterion for ownership. In some embodiments, the data feed comprises the opportunities. From 1129, the process 1120 ends.

Figure 11C:
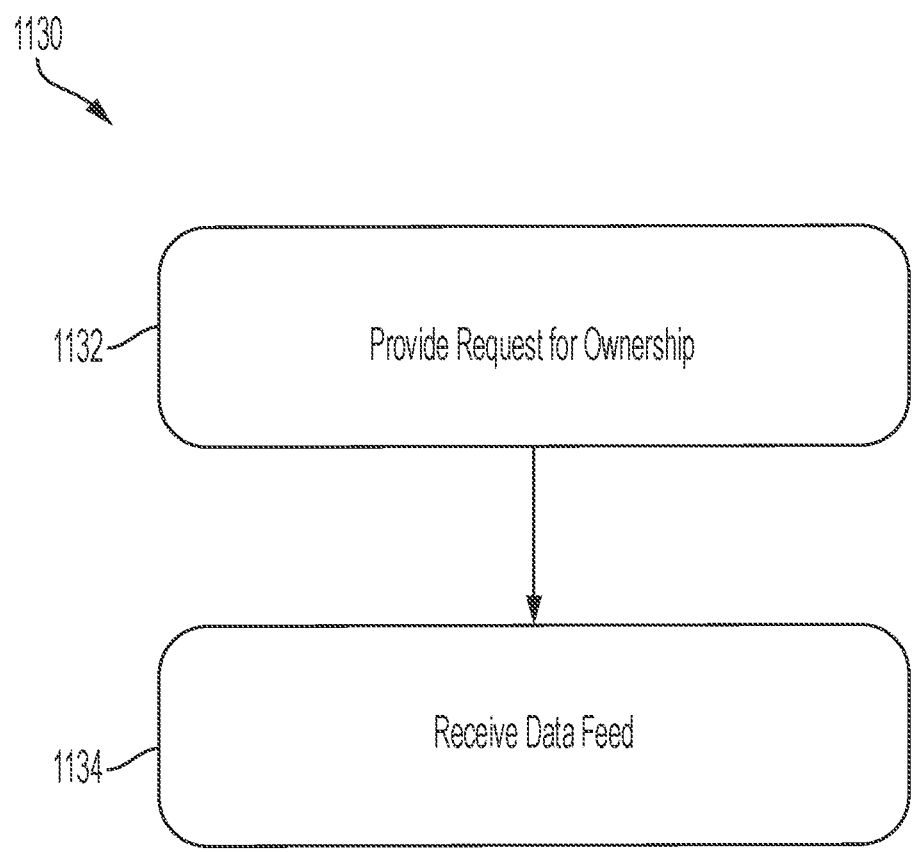

For process 1130 as depicted in FIG. 11C, at 1132 a request for ownership of a brand is provided to a back-end system. In some embodiments, the request comprises user credentials, a data grouping, and consent for a Brand Node associated with the brand to access the data grouping. In some embodiments, the data grouping is determined based on a criterion for ownership of the brand. From 1132, the process 1130 proceeds to 1134.

At 1134, a data feed comprising a plurality of opportunities associated with the brand is received from the back-end system. In some embodiments, the opportunities are provided by a smart ownership contract stored to a distributed ledger and associated with the user credentials and the brand. From 1134, the process 1130 ends.

Figure 11D:
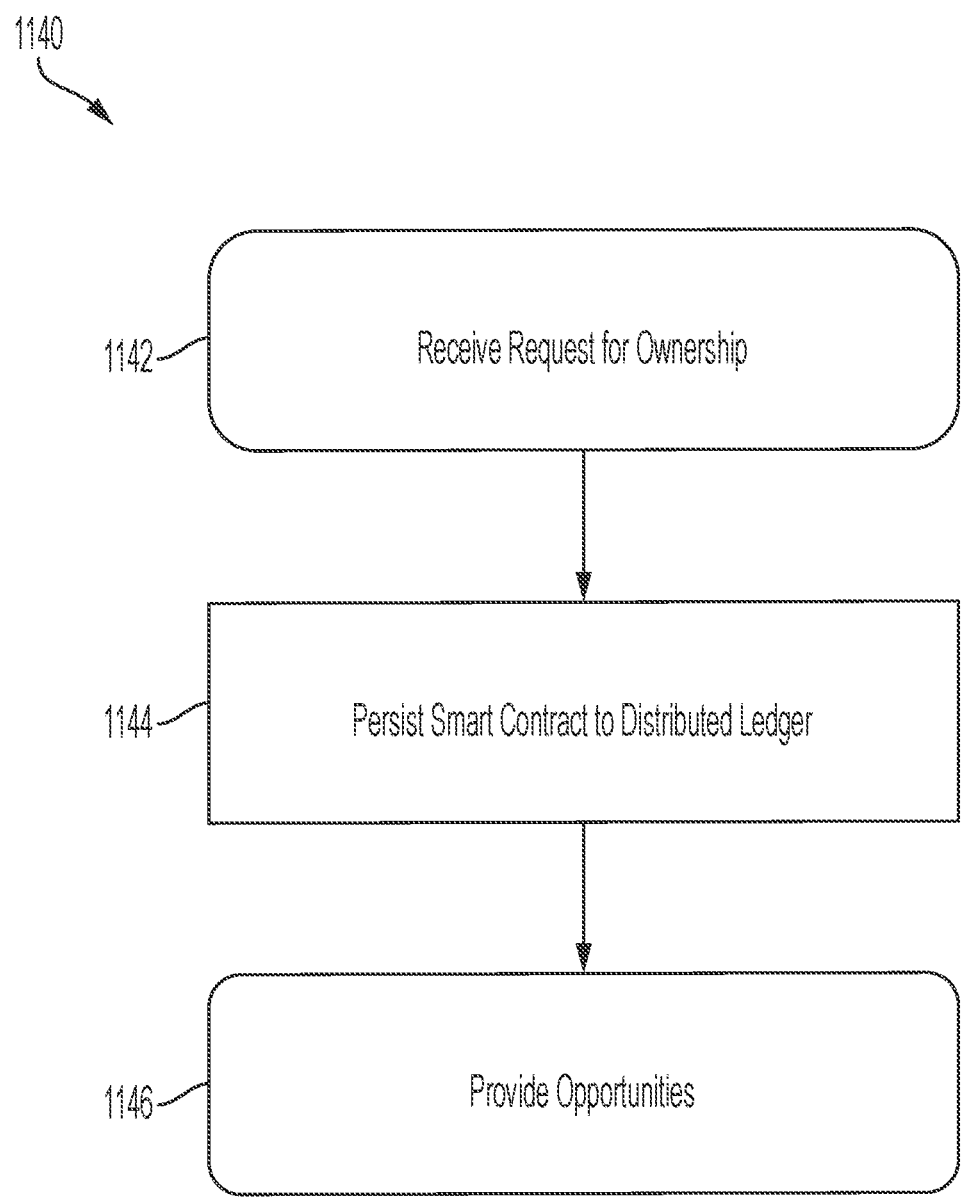

For process 1140 as depicted in FIG. 11D, at 1142 a request for ownership of a brand is received for a computing device. In some embodiments, the request comprising a data grouping. From 1142, the process 1130 proceeds to 1144.

At 1144, a smart contract is persisted to a distributed ledger. In some embodiments, the smart contract is associated with the brand and generated based on the data grouping satisfying a criterion for ownership of the brand. From 1144, the process 1130 proceeds to 1146.

At 1146, a plurality of opportunities is provided, based on the data grouping satisfying the criterion for ownership, to the computing device by executing the smart contract. From 1146, the process 1140 ends.

Processing Devices and Processors

In some embodiments, the platforms, systems, media, and methods described herein include a computer, or use of the same. In further embodiments, the computer includes one or more hardware central processing units (CPUs) or general purpose graphics processing units (GPGPUs) that carry out the device's functions. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage or memory device. The storage or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc read-only memory (CD-ROM), digital versatile disc (DVD), flash memory devices, magnetic disk drives, magnetic tapes drives, optical disk drives, and cloud computing based storage. In further embodiments, the storage and/or memory device is a combination of devices such as those disclosed herein.

In some embodiments, the computer includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 12:
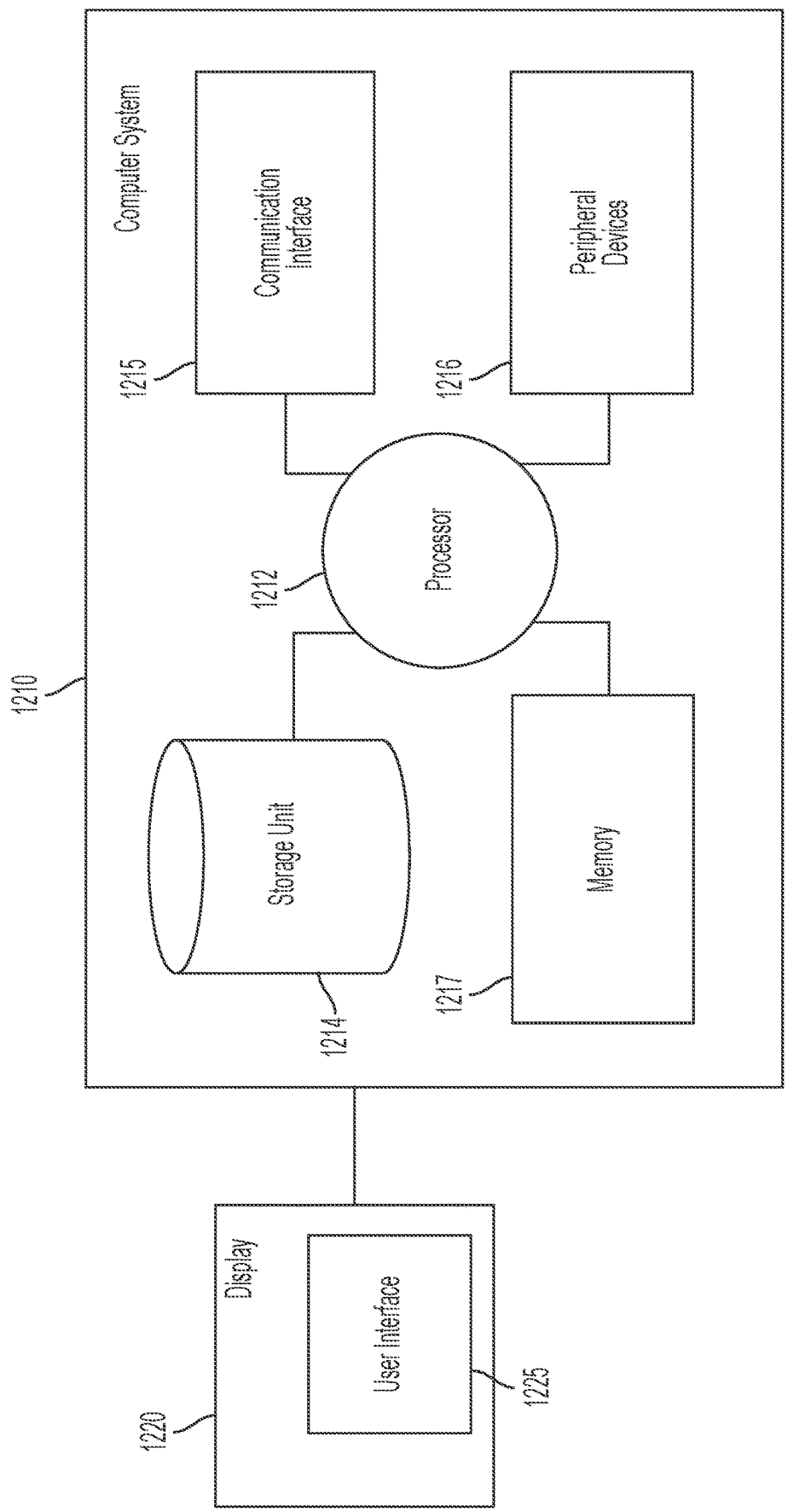
FIG. 12 depicts a non-limiting example a computer system that can be programmed or otherwise configured to implement methods or systems of the present disclosure.

Computer control systems are provided herein that can be used to implement the platforms, systems, media, and methods of the disclosure. FIG. 12 depicts an example a computer system 1210 that can be programmed or otherwise configured to implement platforms, systems, media, and methods of the present disclosure. For example, the computing device 1210 can be programmed or otherwise configured to receive the above describe CloudChain Global Marketplace, the BrandCube, and/or a data feed provided by the described interoperable cloud-based system.

In the depicted embodiments, the computing device 1210 includes a CPU (also "processor" and "computer processor" herein) 1212, which is optionally a single core, a multi core processor, or a plurality of processors for parallel processing. The computing device 1210 also includes memory or memory location 1217 (e.g., random-access memory, read-only memory, flash memory), electronic storage unit 1214 (e.g., hard disk), communication interface 1215 (e.g., a network adapter) for communicating with one or more other systems, and peripheral devices 1216, such as cache, other memory, data storage and/or electronic display adapters. In some embodiments, the memory 1217, storage unit 1214, interface 1215 and peripheral devices 1216 are in communication with the CPU 1212 through a communication bus (solid lines), such as a motherboard. The storage unit 1214 comprises a data storage unit (or data repository) for storing data. The computing device 1210 is optionally operatively coupled to a computer network, such as the network 1310 depicted and described in FIG. 13A, with the aid of the communication interface 1215. In some embodiments, the computing device 1210 is configured as a back-end server deployed within the described interoperable cloud-based system.

In some embodiments, the CPU 1212 can execute a sequence of machine-readable instructions, which can be embodied in a program or software. The instructions may be stored in a memory location, such as the memory 1217. The instructions can be directed to the CPU 1212, which can subsequently program or otherwise configure the CPU 1212 to implement methods of the present disclosure. Examples of operations performed by the CPU 1212 can include fetch, decode, execute, and write back. In some embodiments, the CPU 1212 is part of a circuit, such as an integrated circuit.

One or more other components of the computing device 1210 can be optionally included in the circuit. In some embodiments, the circuit is an application specific integrated circuit (ASIC) or a FPGA.

In some embodiments, the storage unit 1214 stores files, such as drivers, libraries and saved programs. In some embodiments, the storage unit 1214 stores user data, e.g., user preferences and user programs. In some embodiments, the computing device 1210 includes one or more additional data storage units that are external, such as located on a remote server that is in communication through an intranet or the internet.

In some embodiments, the computing device 1210 communicates with one or more remote computer systems through a network. For instance, the computing device 1210 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 1210 via a network.

In some embodiments, the platforms, systems, media, and methods as described herein are implemented by way of machine (e.g., computer processor) executable code stored on an electronic storage location of the computing device 1210, such as, for example, on the memory 1217 or the electronic storage unit 1214. In some embodiments, the CPU 1212 is adapted to execute the code. In some embodiments, the machine executable or machine readable code is provided in the form of software. In some embodiments, during use, the code is executed by the CPU 1212. In some embodiments, the code is retrieved from the storage unit 1214 and stored on the memory 1217 for ready access by the CPU 1212. In some situations, the electronic storage unit 1214 is precluded, and machine-executable instructions are stored on the memory 1217. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 1210 can include or be in communication with an electronic display 1220. In some embodiments, the electronic display 1220 provides a UI 1225 that depicts various screen such as the examples depicted in FIGS. 10A-10J.

Figure 13A:
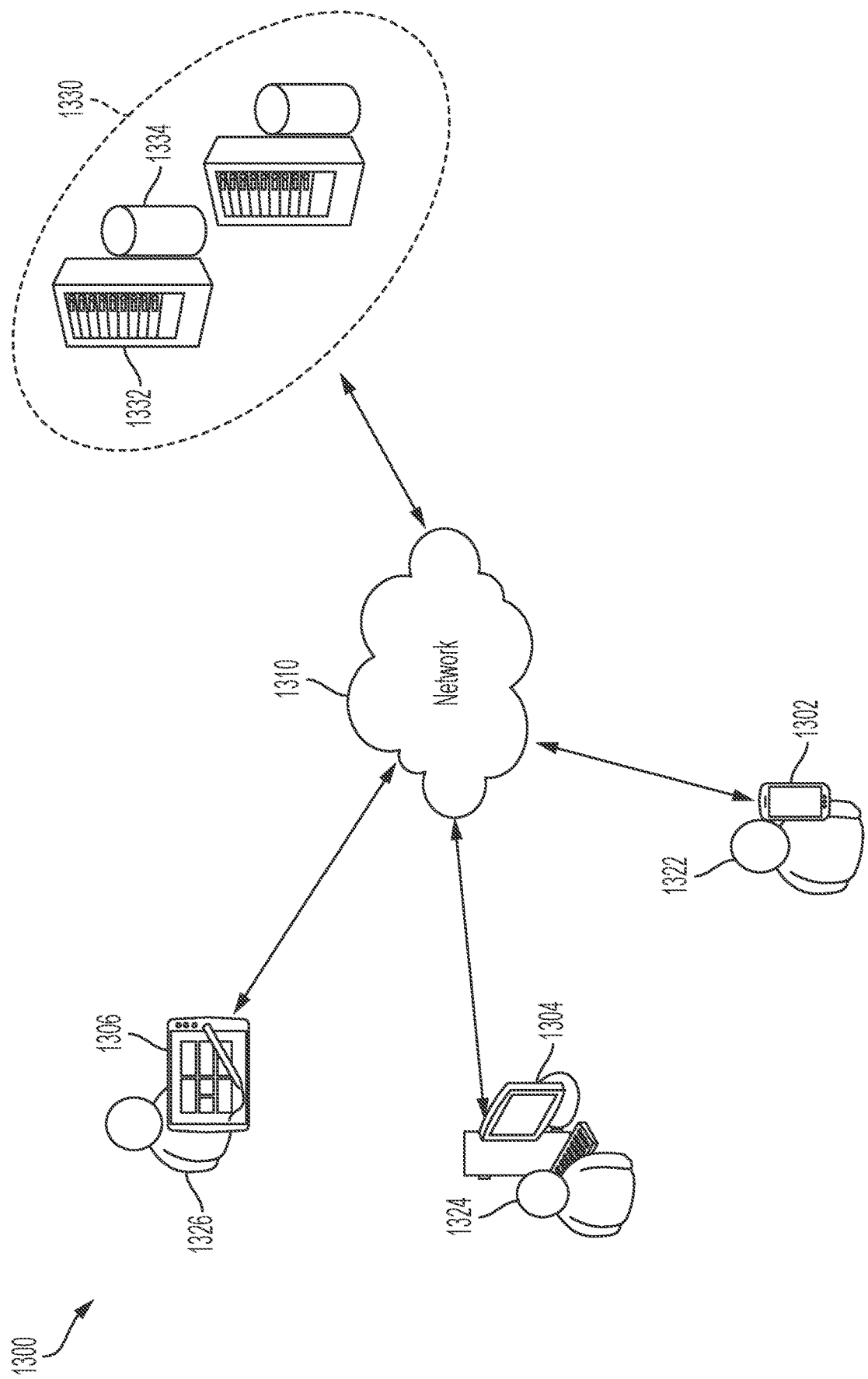
FIG. 13A depicts a non-limiting example environment that can be employed to execute implementations of the present disclosure.

FIG. 13A depicts an example environment 1300 that can be employed to execute implementations of the present disclosure. The example system 1300 includes computing devices 1302, 1304, 1306, a back-end system 1330, and a network 1310. In some embodiments, the network 1310 includes a local area network (LAN), wide area network (WAN), the Internet, or a combination thereof, and connects web sites, devices (e.g., the computing devices 1302, 1304, and 1306) and back-end systems (e.g., the back-end system 1330). In some embodiments, the network 1310 includes the Internet, an intranet, an extranet, or an intranet and/or extranet that is in communication with the Internet. In some embodiments, the network 1310 includes a telecommunication or a data network. In some embodiments, the network 1310 can be accessed over a wired or a wireless communications link. For example, mobile computing devices (e.g., the smartphone device 1302 and the tablet device 1306), can use a cellular network to access the network 1310.

The described interoperable cloud-based system may be employed within the example environment 1300 to, for example, employ machine learning/AI techniques for processing the user preferences through a machine-learning algorithm to determine the opportunities, the machine learning algorithm having been trained with received user preference for a respective plurality of users who have claimed ownership of the brand.

In some examples, the users 1322, 1324, and 1326 interact with the described interoperable cloud-based system through a GUI or application that is installed and executing on their respective computing devices 1302, 1304, and 1306. In some examples, the computing devices 1302, 1304, and 1306 provide viewing data to screens with which the users 1322, 1324, and 1326, can interact. In some embodiments, the computing devices 1302, 1304, 1306 are sustainably similar to computing device 1210 depicted in FIG. 12. The computing devices 1302, 1304, 1306 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 1302, 1304, and 1306 are depicted in FIG. 13A for simplicity. In the depicted example environment 1300, the computing device 1302 is depicted as a smartphone, the computing device 1304 is depicted as a tablet-computing device, and the computing device 1306 is depicted a desktop computing device. It is contemplated, however, that implementations of the present disclosure can be realized with any of the appropriate computing devices, such as those mentioned previously. Moreover, implementations of the present disclosure can employ any number of devices as required.

In the depicted example environment 1300, the back-end system 1330 includes at least one server device 1332 and at least one data store 1334. In some embodiments, the device 1332 is sustainably similar to computing device 1210 depicted in FIG. 12. In some embodiments, the back-end system 1330 may include server-class hardware type devices. In some embodiments, the server device 1332 is a server-class hardware type device. In some embodiments, the back-end system 1330 includes computer systems using clustered computers and components to act as a single pool of seamless resources when accessed through the network 1310. For example, such implementations may be used in data center, cloud computing, storage area network (SAN), and network attached storage (NAS) applications. In some embodiments, the back-end system 1330 is deployed using a virtual machine(s). In some embodiments, the data store 1334 is a repository for persistently storing and managing collections of data. Example data store that may be employed within the described interoperable cloud-based system include data repositories, such as a database as well as simpler store types, such as files, emails, and so forth. In some embodiments, the data store 1334 includes a database. In some embodiments, a database is a series of bytes or an organized collection of data that is managed by a database management system (DBMS).

In some embodiments, the at least one server system 1332 hosts one or more computer-implemented services, such as described above, provided by the described interoperable cloud-based system that users 1322, 1324, and 1326 can interact with using the respective computing devices 1302, 1304, and 1306.

Figure 13B:
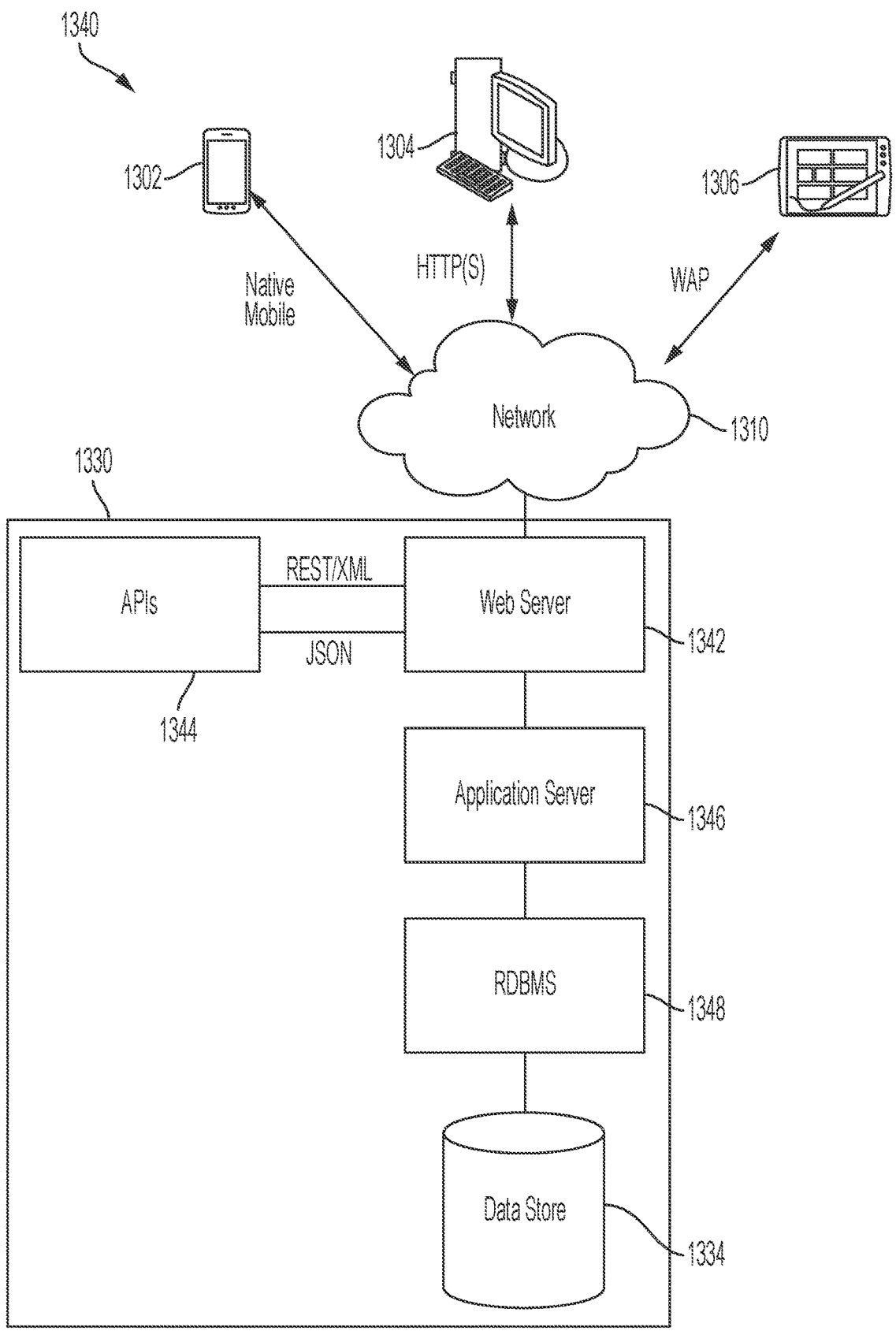
FIG. 13B depicts a non-limiting example application provision system that can be provided through an environment and employed to execute implementations of the present disclosure.

FIG. 13B depicts an example application provision system 1340 that can be provided through an environment, such as the example environment 1300 and employed to execute implementations of the present disclosure. As depicted, the example application provision system 1340 includes the back-end system 1330 configured to include one or more data stores 1334 accessed by a relational database management system (RDBMS) 1348. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. As depicted, the example application provision system 1340 includes the back-end system 1330 configured to include one or more application severs 1346 (such as Java servers, .NET servers, PHP servers, and the like) and one or more web servers 1342 (such as Apache, IIS, GWS and the like). The web server(s) 1342 optionally expose one or more web services via an API 1344 via the network 1310. In some embodiments, the example application provision system 1340 provides browser-based or mobile native UIs to the computing devices 1302, 1304, 1306.

Figure 13C:
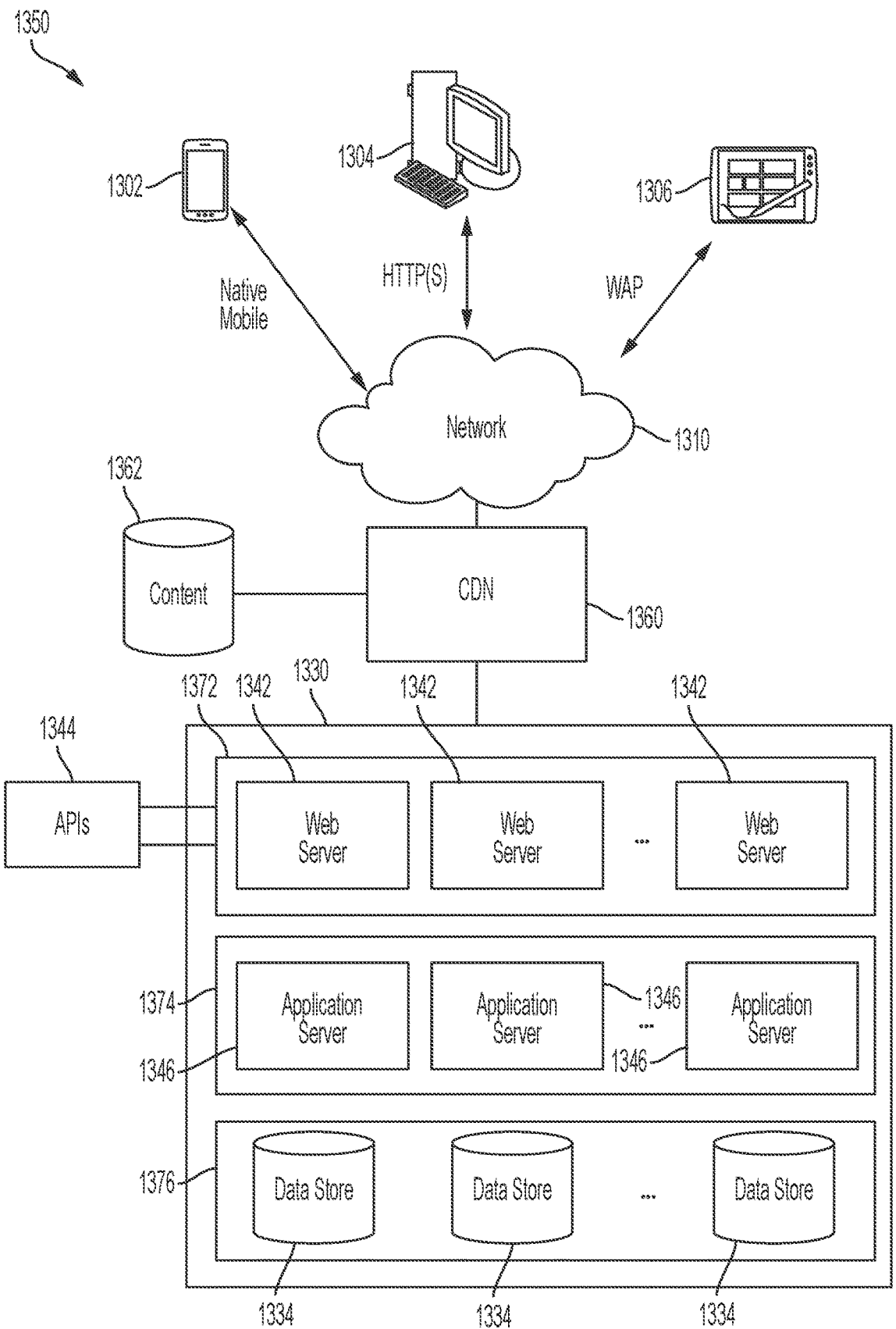
FIG. 13C depicts a non-limiting example cloud-based architecture of an application provision system that can be provided through an environment and employed to execute implementations of the present disclosure.

FIG. 13C depicts an example cloud-based architecture of an application provision system 1350 that can be provided through an environment, such as the example environment 1300, and employed to execute implementations of the present disclosure. The application provision system 1350 includes the back-end system 1330 configured to include elastically load balanced, auto-scaling web server resources 1372, application server resources 1374, as well as synchronously replicated stores 1376. In some embodiments, of the example cloud-based architecture of an application provision system 1350, content 1362 of services are provided through a content delivery network (CDN) 1360 coupled with the back-end system 1330. In some embodiments, a CDN is a geographically distributed network of proxy servers and respective data centers that provides high availability and high performance through distributing the service spatially relative to the receiving devices, such as commuting devices 1302, 1304, and 1306.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model to determine brands to provide is a respective data feed for a user to provide display variance. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received user data mappings and preferences may be employed to train various algorithms. Moreover, as described above, these algorithms can be continuously trained/retrained using real-time user data as it is received. In some embodiments, the machine learning algorithm employs regression modelling where relationships between variables are determined and weighted.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include one or more databases, or use of the same. In view of the disclosure provided herein, those of skill in the art will recognize that many databases are suitable for receiving, for example, user, credential, biometric, brand, ownership, opportunity, transaction history, and location data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Databases

In some embodiments, the platforms, systems, media, and methods disclosed herein include one or more databases, or use of the same. In view of the disclosure provided herein, those of skill in the art will recognize that many databases are suitable for receiving weather, maritime, environmental, civil, governmental or military data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

What is claimed is:

1. An interoperable cloud-based system, comprising:
  a distributed ledger;
  a back-end system; and
  a personal computing device, configured to:
    provide, to the back-end system, a request for ownership of a brand, wherein the request comprises user credentials and a data grouping; and
    receive, from the back-end system, a data feed comprising a plurality of opportunities associated with the brand;
  the back-end system configured to:
    receive, from a Brand Node associated with the brand, a criterion for ownership and the opportunities, wherein the data grouping is determined based the criterion for ownership;
    receive, from the personal computing device, the request for ownership of the brand; and
    generate a smart ownership contract associated with the user credentials and the brand, the smart ownership contract comprising a set of instructions, which, when invoked and executed by one or more processors, cause the one or more processors to perform operations comprising:

providing, to the personal computing device, the data feed based on the provided data grouping satisfying the criterion for ownership;

persist the smart ownership contract to the distributed ledger; and invoke, when prompted by the Brand Node, the smart ownership contract to provide the data feed to the personal computing device.

2. The system of claim 1, wherein the smart ownership contract is updated based on a multi-signature model that requires receiving approval from both the Brand Node and the personal computing device before a change is implemented; and wherein the back-end system is configured to: receive, from the Brand Node, a proposal to change contents of data mapping; provide the proposal to the personal computing device; and update the smart ownership contract with the changed contents of the data mapping based on an approval received from the personal computing device.

3. The system of claim 1, wherein the personal computing device is configured to:

provide a view of the brands owned by the user credentials, wherein the ownership of a brand is determined based on a respective smart ownership contract between the user credentials and each of the respective brands owned by the user credentials.

4. The system of claim 1, wherein facial recognition or biometrics are used to secure the personal computing device and provide profile verification.

5. The system of claim 1, wherein the generation of the smart ownership contract does not reveal an identity of a user associated with the user credentials, wherein the request comprises consent from the user for the Brand Node to access the data grouping, and wherein the criterion for ownership comprises a request for at least one specific type of personal data or metric, and wherein the data grouping comprises the at least one specific type of personal data or metric for the user.

6. The system of claim 1, wherein the user credentials comprise universal personal identification (UPI) and a private key associated with a corresponding public address; wherein the back-end system is configured to: encrypt the data grouping, and persist the encrypted data grouping to a second distributed ledger; wherein the second distributed ledger comprises an identity blockchain; wherein the encrypted data grouping is persisted within a block; and wherein the public address is a pointer in the chain to the encrypted data grouping.

7. The system of claim 1, wherein the personal computing device is configured to: receive personal data from a user interface, and generate a Master Data Group comprising the personal data; wherein the personal computing device is configured to: generate the user credentials and a recovery seed, through an identity chain service provided by the back-end system, and persist the Master Data Group, wherein the Master Data Group is associated with the generated user credentials and the recovery seed; and wherein the Master Data Group comprises the data grouping.

8. The system of claim 1, wherein the personal computing device is configured to:

access, through a block explorer provided by the back-end system, a transaction history associated with the user credentials and stored to the distributed ledger.

9. The system of claim 1, wherein the opportunities comprise brand data, and wherein the brand data is self-contained under the Brand Node, wherein the brand data comprises media associated with the Brand Node, and wherein the brand data comprises investment capital, corporate events, corporate social responsibility, affiliate marketing, product distribution, executive access, product launches, product catalogs, data regarding a headquarters of the brand, data regarding executives of the, and a stock ticker for the brand.

10. The system of claim 1, wherein the set of instructions of the smart ownership contract comprise:

providing the Brand Node associated with the brand access to the data grouping.

11. The system of claim 1, wherein the personal computing device is configured to:

provide, to the back-end system, user preferences for a user associated with the user credentials, wherein the set of instructions of the smart ownership contract comprise:

processing the user preferences through a machine-learning model to determine the opportunities, the machine-learning model having been trained with received user preference for a respective plurality of users who have claimed ownership of the brand.

12. The system of claim 1, wherein the personal computing device is configured to:

provide, to the back-end system through a geo-location application programing interface (API), real-time geo-location data, wherein the back-end system is configured to:

perform a verification check on a location of the personal computing device based on the received real-time geo-location data, wherein the opportunities comprise real-time incentives based on a verified location of the personal computing device.

13. The system of claim 1, wherein the data feed comprises content provided by a plurality of brands, wherein the data feed comprises a user stream and a business opportunities stream, and wherein the user stream and the business opportunities stream are employed to provide display variance of the content provided to the personal computing device based on a plurality of smart ownership contracts associated with the user credentials and the brands determined to be potential matches for ownership.

14. The system of claim 1, wherein the Brand Node is generated for an on-boarded brand entity, and wherein the on-boarded brand entity populates content, accesses data, and taps networks through a Brand Node Interface.

15. The system of claim 1, wherein the smart ownership contract allows a free-flow of information between the personal computing device and the Brand Node as a peer-to-peer communication flow.

16. The system of claim 1, wherein a collaborative filtering algorithm recommends brands and products based on similar activities of other users, wherein the recommended brands and products are provided to the personal computing device through the data feed and filtered based on a showcase immersion algorithm.

17. The system of claim 1, wherein the request for ownership of the brand includes a digital signature.

18. A computer-implemented method for a secure exchange of personal data with brand data, the method being executed by one or more processors and comprising:

receiving, from a Brand Node associated with a brand, a criterion for ownership and a plurality of opportunities, wherein the opportunities comprise the brand data;

receiving, from a computing device, a request for ownership of the brand; wherein the request comprises user credentials and a data grouping, wherein the data grouping is determined based the criterion for ownership and comprises the personal data; and generating a smart ownership contract associated with the user credentials and the brand, the smart ownership contract comprising a set of instructions, which, when invoked and executed by the one or more processors, cause the one or more processors to perform operations comprising:

providing, to the computing device, a data feed based on the provided data grouping satisfying the criterion for ownership, wherein the data feed comprises the opportunities;

persisting the smart ownership contract to a distributed ledger; and invoking, when prompted by the Brand Node, the smart ownership contract to provide the opportunities to the computing device.

19. One or more non-transitory computer-readable storage media coupled to one or more processors and having instructions stored thereon which, when executed by the one or more processors, cause the one or more processors to perform operations comprising:

providing, to a back-end system, a request for ownership of a brand, wherein the request comprises user credentials, a data grouping, and consent for a Brand Node associated with the brand to access the data grouping, wherein the data grouping is determined based on a criterion for ownership of the brand; and receiving, from the back-end system, a data feed comprising a plurality of opportunities associated with the brand, wherein the opportunities are provided by a smart ownership contract stored to a distributed ledger and associated with the user credentials and the brand.

20. A computer-implemented method for a secure exchange of data, the method being executed by one or more processors and comprising:

receiving, from a computing device, a request for ownership of a brand, the request comprising a data grouping;

persist a smart contract to a distributed ledger, the smart contract associated with the brand and generated based on the data grouping satisfying a criterion for ownership of the brand; and providing, to the computing device, by executing the smart contract, a plurality of opportunities based on the data grouping satisfying the criterion for ownership.

* * * * *